United States Patent
Maher et al.

(10) Patent No.: US 11,235,841 B1
(45) Date of Patent: Feb. 1, 2022

(54) LASHING SYSTEM AND METHOD FOR USE IN CARGO SHIPS

(71) Applicant: Trendsetter Vulcan Offshore, Inc., Houston, TX (US)

(72) Inventors: James V. Maher, Houston, TX (US); David Sverre, Gibbons (CA); Ricky Brown, Houston, TX (US); Eugene Pentimonti, Great Falls, VA (US)

(73) Assignee: Trendsetter Vulcan Offshore, Inc., Houston, TX (US)

( * ) Notice: Subject to any disclaimer, the term of this patent is extended or adjusted under 35 U.S.C. 154(b) by 0 days.

(21) Appl. No.: 17/316,297

(22) Filed: May 10, 2021

Related U.S. Application Data

(60) Provisional application No. 63/167,564, filed on Mar. 29, 2021, provisional application No. 63/145,361, filed on Feb. 3, 2021.

(51) Int. Cl.
*B60P 7/13* (2006.01)
*B63B 25/28* (2006.01)
*B63B 25/24* (2006.01)
*B60P 7/08* (2006.01)

(52) U.S. Cl.
CPC ............ *B63B 25/28* (2013.01); *B60P 7/0861* (2013.01); *B60P 7/13* (2013.01); *B63B 25/24* (2013.01); *B63B 2025/285* (2013.01)

(58) Field of Classification Search
CPC .. B60P 7/13; B60P 7/18; B60P 7/0815; B60P 7/10; B60P 7/0861; B63B 25/28; B63B 25/24; B63B 2025/285; B63B 25/004
USPC ........ 410/32, 34, 68, 77, 80, 81, 85, 96, 97, 410/100
See application file for complete search history.

(56) References Cited

U.S. PATENT DOCUMENTS

| 3,083,670 | A | * | 4/1963 | Harlander ................ B60P 7/13 410/85 |
| 3,776,169 | A | * | 12/1973 | Strecker ................ B63B 25/28 410/77 |
| 3,934,855 | A |   | 1/1976 | Patterson, III et al. |

(Continued)

FOREIGN PATENT DOCUMENTS

| DE | 19701053 A1 | 7/1998 |
| WO | 2017013273 A1 | 1/2017 |

OTHER PUBLICATIONS

International Search Report and Written Opinion issued in corresponding international application serial No. PCT/US2021/044990 dated Nov. 17, 2021, 11 pages.

*Primary Examiner* — Stephen T Gordon
(74) *Attorney, Agent, or Firm* — Jonathan Pierce; Pierre Campanac; Porter Hedges LLP

(57) ABSTRACT

A lashing system is usable on cargo ships that are transporting shipping containers, optionally as a supplement to standard lashing bridges provided on cargo ships. The lashing system includes a support that can interface with the preexisting interlocking system provided on the shipping containers. The support can be lifted and placed on a stack of shipping containers using the same cranes used for loading and unloading shipping containers. The lashing system includes lashings that are attached to the support and are releasably connectable to another shipping container or to a structure of the cargo ship. The tension in the lashings is preferably monitored during the trips of the cargo ships.

24 Claims, 16 Drawing Sheets

(56) References Cited

U.S. PATENT DOCUMENTS

| | | | | |
|---|---|---|---|---|
| 4,645,392 A | * | 2/1987 | Takaguchi | B60P 7/132 |
| | | | | 410/80 |
| 6,027,291 A | * | 2/2000 | Sain | B65D 90/0013 |
| | | | | 410/77 |
| 8,847,758 B2 | * | 9/2014 | Eide | B60P 7/0861 |
| | | | | 340/568.1 |
| 10,328,842 B2 | * | 6/2019 | McNally | B60P 7/0861 |
| 2006/0088394 A1 | | 4/2006 | Bruun | |
| 2015/0063937 A1 | | 3/2015 | Brewster et al. | |
| 2015/0377268 A1 | | 12/2015 | Knox | |
| 2017/0267159 A1 | | 9/2017 | Bruhn | |

* cited by examiner

LASHING SYSTEM AND METHOD FOR USE IN CARGO SHIPS

CROSS-REFERENCE TO RELATED APPLICATIONS

This application claims the benefit of priority to provisional application Ser. No. 63/145,361 filed on Feb. 3, 2021. The content of provisional application Ser. No. 63/145,361 is incorporated herein by reference for any and all purposes.

This application also claims the benefit of priority to provisional application Ser. No. 63/167,564 filed on Mar. 29, 2021. The content of provisional application Ser. No. 63/167,564 is incorporated herein by reference for any and all purposes.

BACKGROUND

This disclosure relates generally to methods and systems for securing shipping containers on a cargo ship. This disclosure relates more particularly to methods and systems for lashing shipping containers that can either supplement or replace the lashing systems usually used on cargo ships.

Cargo ships can accidentally lose large numbers of shipping containers at sea while sailing through heavy seas. As ships become bigger and shipping containers are stacked higher, the customary lashing system design which has been used for many years cannot provide an acceptable level of restraint. The movement of the upper containers that is caused by the ship's pitch and roll under the influence of waves increases. This movement can destabilize the shipping containers because of the higher acceleration levels of the upper containers.

SUMMARY

The disclosure describes a method of stabilizing shipping containers stored on a cargo ship.

The method may comprise the step of providing a lashing apparatus that includes a support capable of interfacing with an interlocking system of one or more shipping containers, and a lashing. The lashing apparatus may further include a foundation, a first releasable connector mounted on the foundation, and a second releasable connector included at the end of the lashing and adapted to be releasably coupled to the first releasable connector. For example, the second releasable connector includes an eye and shackle assembly or a turnbuckle. The lashing apparatus may further comprise an accelerometer coupled to the support or a load pin coupled to the foundation and capable of measuring tension in the lashing. The accelerometer or the load pin may be wirelessly connected to a computer. The computer may be programmed to drive a winch. In some embodiments, the lashing apparatus may include a ratcheting track and a pawl configured to slide on the ratcheting track. Also, the end of the lashing may include a turnbuckle. In some embodiments, the lashing apparatus may include means for wrapping the lashing that are mounted on the support. For example, the means for wrapping the lashing comprise a winch, a bollard attached to a pin, a fairlead attached to a pin, or a combination thereof. The means for wrapping the lashing may alternatively or additionally comprise an equivalent of a winch, a bollard attached to a pin, a fairlead attached to a pin, or a combination thereof. The support may include a plurality of sockets, each sized to receive a pin attached to a bollard or a pin attached to a fairlead. In some embodiments, the lashing apparatus may include a ratcheting track and a pawl configured to slide on the ratcheting track, as well as means for wrapping the lashing that are mounted on the support.

The method may comprise the step of securing the support to one or more shipping containers.

The method may comprise the step of securing the foundation to at least one of a lashing bridge, a lashing tie-rod, or a deck of the cargo ship. In some embodiments, securing the foundation to at least one of the lashing bridge, the lashing tie-rod, or the deck of the cargo ship may comprise securing the ratcheting track to at least one of the lashing bridge or the deck of the cargo ship. Optionally, securing the foundation to the at least one of a lashing bridge, a lashing tie-rod, or a deck of the cargo ship may comprise releasably attaching the ratcheting track to container connectors provided on a hatch cover of the cargo ship.

In some embodiments, the method may comprise the step of providing one or more lashing apparatus, each including at least a support capable of interfacing with an interlocking system of one or more shipping containers, and a lashing.

The method may comprise the step of lifting a lashing cage to transport an operator to the support of at least one apparatus, and connecting the lashing cage to the support. The lashing cage may comprise a lower level having a handrail. The lower level may be at least partially floorless. The lashing cage may also comprise an upper level having a handrail. The upper level may have a floor. The lower level may be accessible by the operator from the upper level.

The method may comprise the step of coupling the lashing to the support.

The method may comprise the step of connecting an end of the lashing to another shipping container or to a structure of the cargo ship. Connecting the end of the lashing to the other shipping container or to the structure of the cargo ship may comprise coupling the first releasable connector to the second releasable connector.

The method may comprise the step of placing one or more shipping containers on top of the support.

The method may comprise the step of applying tension to the lashing such as to reduce movement of the support. In some embodiments, applying tension to the lashing may comprise adjusting a position of the pawl along the ratcheting track. For example, adjusting the position of the pawl may be performed with a winch coupled to the foundation. Applying tension to the lashing may further comprise adjusting a length of the turnbuckle. In some embodiments, applying tension to the lashing may involve adjusting a position of at least one of the means for wrapping the lashing. For example, adjusting the position of the at least one of the means for wrapping the lashing may comprise removing the pin attached to a bollard or the pin attached to a fairlead from one of the plurality of sockets and receiving the pin attached a bollard or the pin attached to a fairlead into another one of the sockets. Applying tension to the lashing may also involve wrapping or unwrapping the lashing to the means of wrapping the lashing.

The method may comprise the step of storing the lashing cage on top of the support of one apparatus during a trip of the cargo ship to a harbor.

The method may comprise the step of using the computer to automatically adjust a tension of a lashing attached to the winch based on data received from the accelerometer or the load pin.

The method may comprise the step of using the lashing cage in the harbor to transport an operator.

The disclosure describes a lashing apparatus for use on cargo ships transporting shipping containers.

The lashing apparatus may comprise a support that is capable of interfacing with an interlocking system of one or more shipping containers. In some embodiments, the support may include a plurality of sockets. Each socket may be sized to receive a pin attached to a bollard or a pin attached to a fairlead.

The lashing apparatus may comprise a lashing that is couplable to the support. The lashing may have an end connectable to another shipping container or to a structure of the cargo ship.

The lashing apparatus may comprise a foundation that is adapted to be secured to at least one of a lashing bridge, a lashing tie-rod, or a deck of the cargo ship.

The lashing apparatus may comprise a tensioner capable of applying tension to the lashing such as to reduce movement of the support. In some embodiments, the tensioner may comprise a ratcheting track that is adapted to be secured to at least one of a lashing bridge or a deck of the cargo ship. The tensioner may also comprise a pawl configured to slide on the ratcheting track. The position of the pawl along the ratcheting track may be adjustable. The tensioner may further comprise a turnbuckle that has an adjustable length. The turnbuckle may be included at the end of the lashing. The tensioner may further comprise a winch coupled to the foundation. The winch may be configured to adjust the position of the pawl. In some embodiments, the tensioner may comprise means for wrapping the lashing. The means for wrapping the lashing may be mounted on the support. For example, the means for wrapping the lashing may comprise one or more of a winch, a bollard attached to a pin, and a fairlead attached to a pin. The means for wrapping the lashing may alternatively or additionally comprise an equivalent of one or more of a winch, a bollard attached to a pin, and a fairlead attached to a pin. A position of at least one of the means for wrapping the lashing may be adjustable.

The lashing apparatus may comprise a first releasable connector that is mounted on the foundation.

The lashing apparatus may comprise a second releasable connector that is included at the end of the lashing. The second releasable connector may be adapted to be releasably coupled to the first releasable connector. For example, the second releasable connector may comprise an eye and shackle assembly or a turnbuckle.

The lashing apparatus may comprise an accelerometer coupled to the support or a load pin coupled to the foundation and capable of measuring tension in the lashing. The accelerometer or the load pin may be wirelessly connected to a computer. The computer may be programmed to drive a winch to automatically adjust the tension of the lashing attached to the winch based on data received from the accelerometer or the load pin.

The disclosure describes a lashing cage.

The lashing cage may comprise an upper level. The upper level may have a handrail. The upper level may have a floor.

The lashing cage may comprise a lower level. The lower level may have a handrail. The lower level may be at least partially floorless. The lower level may be accessible by the operator from the upper level; and The lashing cage may comprise any known means for connecting the lashing cage to a crane.

The lashing cage may comprise a winch capable of deploying a lashing.

BRIEF DESCRIPTION OF THE DRAWINGS

For a more detailed description of the embodiments of the disclosure, reference will now be made to the accompanying drawings, wherein.

DETAILED DESCRIPTION

Figure 1:
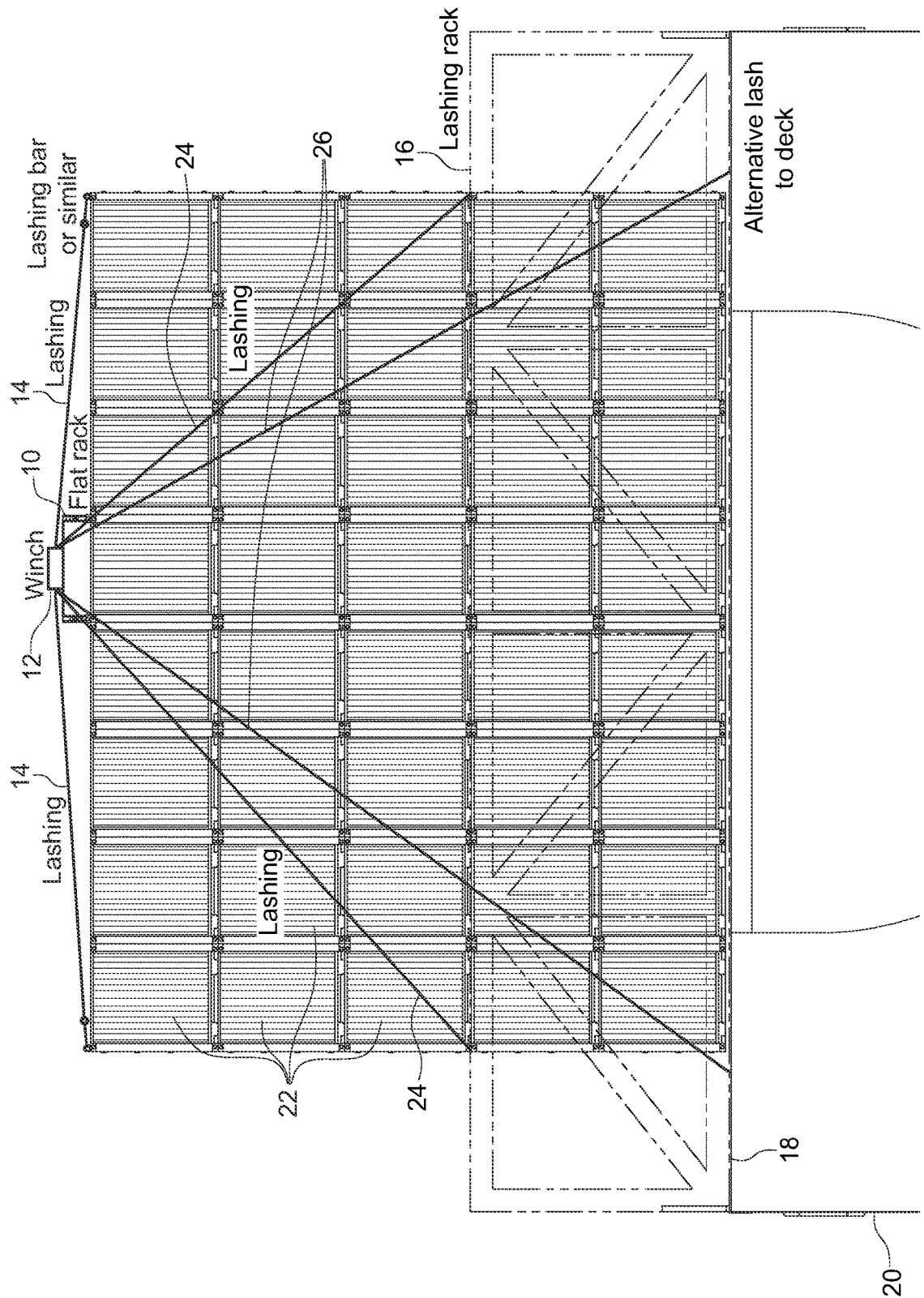
FIG. 1 is an elevation view of a portion of a cargo ship including a lashing bridge and a supplementary lashing system.

The disclosure describes a lashing system and method that are usable on cargo ships. In preferred embodiments, the system may supplement standard lashing bridges with lashing tie-rods or other devices provided on the cargo ship; however, the system can also be used as a stand-alone system. The system comprises a support that can interface with the pre-existing interlocking system provided on shipping containers. The support can be lifted and placed on a stack of shipping containers using the same cranes used for loading and unloading shipping containers. The support can be secured to some of the shipping containers at the top of the stack or to some of the upper shipping containers with additional shipping containers placed on top of the supports. Lashings, for example, in the form of rope sold under the trademark Dyneema or in the form of other stiff, strong, and/or light, flexible members, have one end that is secured to the support and another end that is secured to the ship deck, to the lashing bridges provided on the cargo ship, or to one or more of the shipping containers. Optionally, the lashing can pass through one or more sheaves secured to the ship deck, to the lashing bridges provided on the ship, or to one or more of the shipping containers. The lashings are tensioned, such as to minimize the movement of the support and the shipping containers secured to the support. Depending on the configuration of the stack of containers, spacers or bumpers may be provided between columns of the stack of containers in order to allow the container stack to be pre-loaded from both sides when tension is applied to the lashings.

For example, the support may include a flat rack, or a platform, that can interface via twist-locks or other equivalent interlocking systems.

In some embodiments, winches are mounted on the support. Each of the lashings is wrapped around a reel of the winch. The winch is powered by a power source that is also mounted on the support. For example, the power source may be hydraulic (e.g., a precharged accumulator) or electric (e.g., a battery and motor). As such, the one or more winches can be operated remotely without an operator being present on the support. Each lashing can be ended by an eye and shackle assembly and can be unwrapped from the reel, while the eye and shackle assembly is guided by a crane to an anchor point. The eye and shackle assembly can then be secured to the ship deck, to the lashing bridges provided on the ship, or to one or more of the shipping containers. The winch is used to adjust the tension in one of the lashings. Other known systems for securing the end of the lashing, such as a turnbuckle, may be used instead of the eye and shackle assembly.

Optionally, a wheelhouse computer and a battery are mounted on the support. The wheelhouse computer can receive measurements of the ship's pitch and roll, loads between shipping containers, tension in the lashings, or acceleration of the support, and can automatically adjust the tension of lashings in real-time by actuating winches. Alternatively or additionally, measurements of the ship's pitch and roll, loads between shipping containers, tension in the lashings, or acceleration of the support can be broadcasted wirelessly to a computer located in a room in the cargo ship, where these measurements can be monitored.

Optionally, a solar panel is mounted on the support to recharge a battery connected to a motor that drives the winch.

Optionally, hinged arms are mounted to the support to provide additional points for securing the support to the stack of shipping containers.

Optionally, a bending shoe, or an equivalent structure, is mounted to the support. The bending shoe can be deployed so that it overhangs beyond the stack of shipping containers. The bending shoe can be used to guide the lashings.

In some embodiments, bollards or trunnions are mounted on the support. A position of at least some of the bollards or trunnions on the support is adjustable. For example, the support includes several sockets at fixed locations. The sockets are sized to hold pins attached to the bottom of the bollards or trunnions. The position of a bollard or trunnion can be adjusted by coupling the pin to a socket located in a selected position. Each lashing can be ended by a turnbuckle. Preferably, the turnbuckle is secured to the ship deck, to the lashing bridges provided on the cargo ship, or to one or more of the shipping containers. However, the turnbuckle can be secured to the support instead. The unwrapped length of the lashing can be coarsely adjusted by having an operator position a pair of bollards or trunnions at selected positions and wrap a portion of the lashing around the pair of bollards or trunnions. Once the unwrapped length of the lashing is coarsely adjusted, the tension of the lashing can be finely adjusted using the turnbuckle. Fairleads, chocks, or pad eyes can be used instead of, or in addition to the bollards or trunnions. A position of at least some of the fairleads, chocks, or pad eyes is also adjustable, in a way similar to the bollards or trunnions.

Optionally, a lashing cage can be temporarily connected on top of the support. The lashing cage is used to transport operators to the support so that the operators can position the bollards or trunnions and wrap the lashings. The lashing cage has two levels, each with handrails to ensure the safety of the operators. The lower level is floorless so that the operators can access equipment mounted on the support to which the lashing cage is connected. The higher level has a floor on which operators stand during transportation of the lashing cage with a crane. The higher level can also be used to transport winches that can be used to support the lashings during the installation of the lashings. After installation of the lashings, the lashing cage can be left on the stack of shipping containers during the trip of the cargo ship so that it is readily available in the next harbor.

In a preferred embodiment, tensioners such as the winches may be omitted from some or all of the support, and the tensioning of the lashings may be performed down at a level where access to operators is easily available, such as on the deck or the lashing bridges. The tensioning may involve a ratcheting track and a pawl configured to slide on the ratcheting track. The distance between the ends of the lashings can be coarsely adjusted by changing the position of the pawl along the ratcheting track. Additionally, the end of the lashing includes a turnbuckle, and the tension in the lashings can be finely adjusted by turning the turnbuckle to change its length.

In an embodiment where some lashings are secured between a pair of supports, one of the pair of supports can include bollards or trunnions, which can be mounted on the one of the pair of supports, either on top or on the side thereof, and another of the pair of supports can include a tensioner, which can be mounted on the other of the pair of supports, either on top or on the side thereof. One end of the lashing is attached to the tensioner, and the other end of the lashing is releasably connected to the bollards or trunnions. Fairleads, chocks, or pad eyes can be used instead of, or in addition to the bollards or trunnions.

FIG. 1 shows an elevation view of a portion of a cargo ship 20. A lashing bridge 16 is attached to the deck 18 of the cargo ship 20. Shipping containers 22 are stacked on the deck 18 of the cargo ship 20. Only a few shipping containers are shown for the sake of clarity.

A supplementary lashing system is provided for stabilizing the shipping containers 22. The supplementary lashing system comprises a support. The support is capable of interfacing with an interlocking system of one or more shipping containers located below the support. Typically, but not necessarily, the interfacing is provided by one or more twist-locks which are similar to the twist-locks usually provided on shipping containers. The support is illustrated in FIGS. 1-9 as a flat rack 10. However, supports other than a flat rack may be used in the embodiments illustrated in these Figures. Also, the flat rack 10 may be additionally capable of interfacing with an interlocking system of one or more shipping containers located above the support, for example, using the twist-locks usually provided on shipping containers. The supplementary lashing system also comprises lashings. Each lashing 14 is secured to one of the shipping containers 22 via a releasable connector included at the end of the lashing, and a lashing tie-rod or similar structure secured to the shipping container. Each other lashing 24, 26 is secured to a structure of the cargo ship 20 via a releasable connector included at the end of the lashing, and a foundation, such as a plate bolted or welded on the structure of the cargo ship 20. For example, each lashing 24 is secured (e.g., indirectly secured via a foundation) to the lashing bridge 16, and each lashing 26 is secured (e.g., indirectly secured via a foundation) to the deck 18. The releasable connector may be implemented, for example, with an eye, a shackle, a turnbuckle, a hook, or any known rigging hardware useable for releasably connecting the lashing to a lashing bridge 16, the deck 18, or a lashing tie-rod. The supplementary lashing system also comprises means for wrapping the plurality of lashings that are mounted on the flat rack 10. The means for wrapping the plurality of lashings are illustrated in FIGS. 1-4 as one or more winches 12, which all have a reel on which one of the plurality of lashings can be wrapped. The winches 12 are driven by a motor to wrap or unwrap the lashings during the installation of the supplementary lashing system on the cargo ship, and optionally, to apply tension to the lashings, such as to minimize a movement of the flat rack 10. For example, the motor may be an electric motor powered by a battery, such as a rechargeable battery coupled to solar panels also mounted on the flat rack 10. The winches 12 can be operated remotely.

Figure 2:
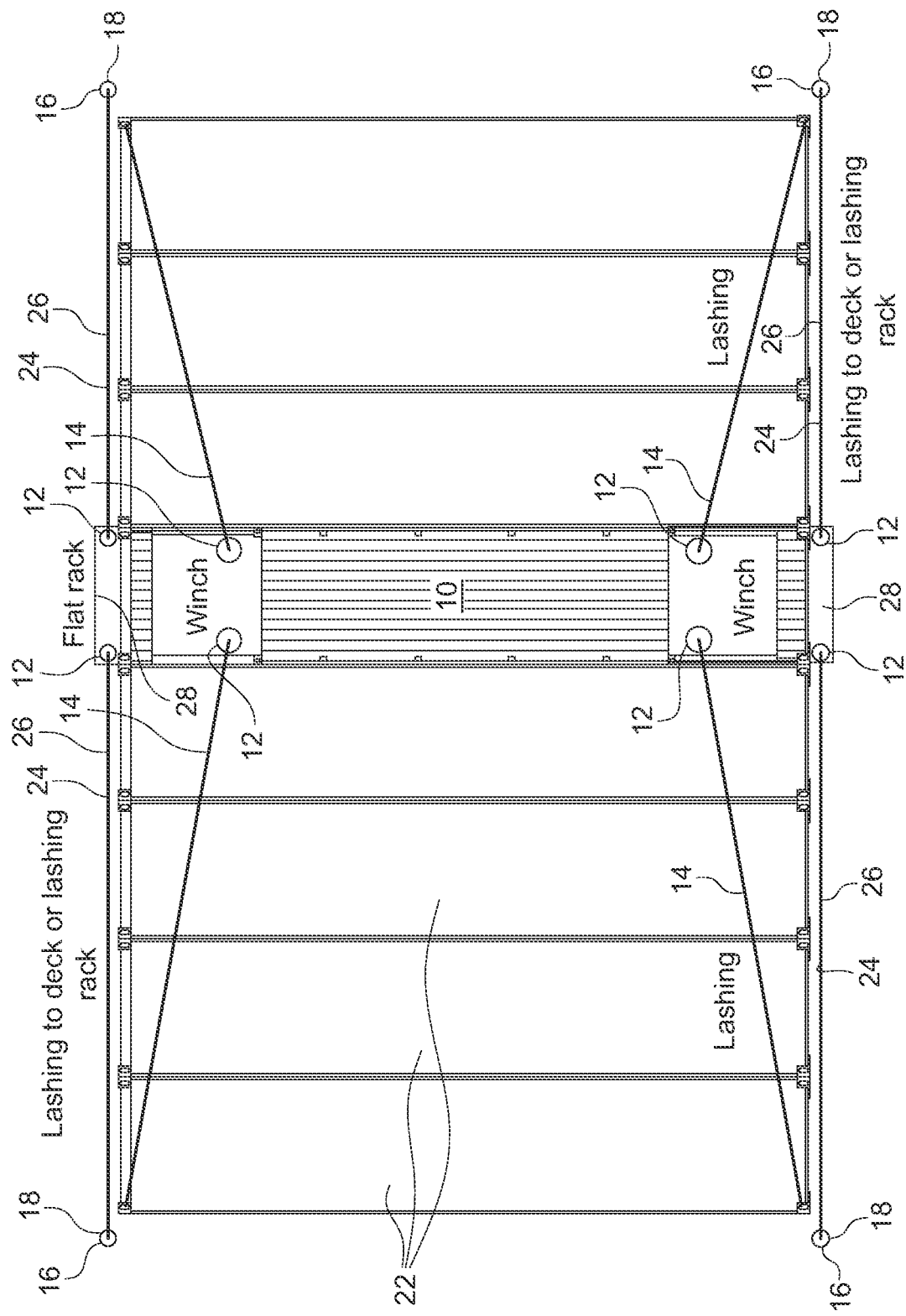
FIG. 2 is a top view of a portion of the cargo ship and supplementary lashing system, for example, the portion of the cargo ship and supplementary lashing system shown in FIG. 1.

FIG. 2 is a top view of the cargo ship 20, shipping containers 22, and supplementary lashing system, such as shown in FIG. 1. Bending shoes 28 are illustrated at the top and the bottom of FIG. 2. The bending shoes 28 overhangs beyond the stack of shipping containers 22 and can be used to guide the lashings 24 and/or 26 from one of the winches 12 to the side of the stack of shipping containers 22. In addition, the lashing 14, 24, and/or 26 can optionally pass through one or more sheaves (not shown) secured to the ship deck, to the lashing bridges provided on the ship, or to one or more of the shipping containers. In such cases, the lashing 14, 24, and/or 26 may not be straight even after being put under tension.

In the example shown in FIG. 2, the flat rack 10 straddles one row of shipping containers 22. However, a 40-feet long flat rack 10 can straddle two rows of 20-feet long shipping containers that are continuous. Other supports can straddle several rows of 20-feet or 40-feet long shipping containers.

In the example shown in FIG. 2, the lashings appear positioned symmetrically about the cross, center plane of the row of shipping containers 22, and asymmetrically about the longitudinal, center plane of the flat rack 10. However, alternative configurations, including, but not limited to, configurations having lashings on only one side of the flat rack 10, are possible. In embodiments where the lashing system is implemented as a supplemental system to existing lashing bridges, at least two lashings are preferably provided in one or more stacked columns of shipping containers 22. As such, the lashings may provide a level of redundancy that is lacking from standard lashing bridges with lashing tie-rods or other devices provided on the cargo ship. In embodiments where the lashing system is implemented as a stand-alone system, four to six lashings are preferably provided in one or more stacked columns of shipping containers 22.

The positioning of the flat rack 10 in the row of shipping containers 22 and the positioning of the end of the lashings that includes a releasable connector may be determined using Finite Element simulations or other equivalent simulations. For example, in embodiments where the lashing system is implemented as a supplemental system to existing lashing bridges, flat racks 10 may be provided on top of the first and last columns of a stack of shipping containers 22. Additionally, flat racks 10 may be provided in the second and next-to-last columns of the stack of shipping containers 22, at a height that is preferably at least one container lower than the height of the flat racks 10 that are provided on top of the first and last columns. In embodiments where the lashing system is implemented as a stand-alone system, flat racks 10 similarly in the first, second, next-to-last, and last columns of a stack of shipping containers 22. Additionally, flat racks 10 are preferably between the second and next-to-last columns, on top of a stacked column of shipping containers 22, and/or at a height lower than the stacked column of shipping containers 22.

Figure 3:
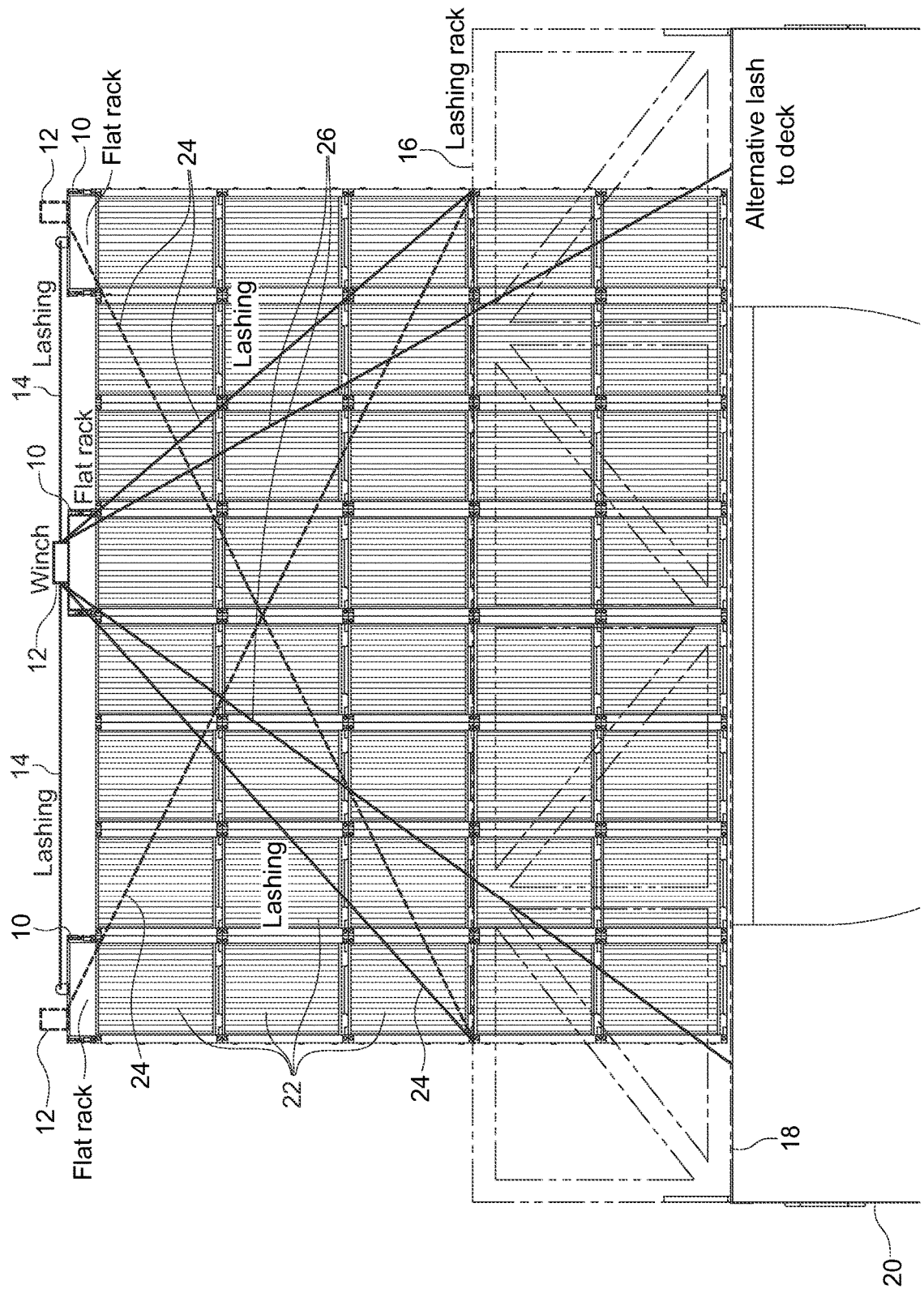
FIG. 3 is an elevation view of a portion of a cargo ship including a lashing bridge and a supplementary lashing system illustrating an alternative configuration of the lashing system.

In the embodiment shown in FIGS. 1 and 2, some of the lashings (i.e., the lashings 14) are secured to lashing tie-rods provided on shipping containers 22. FIG. 3 shows an alternative embodiment where some of the lashings are secured between two flat racks 10. A lashing may be secured to one winch 12 and have an end including a releasable connector coupled to one of the flat racks from which the means for wrapping lashings may be omitted. This configuration may be useful when it is difficult to provide a lashing tie-rod on a shipping container. Instead, all the flat racks 10 can be lifted and placed on the stack of shipping containers 22 using the same cranes used typically for loading and unloading shipping containers. Optionally, the releasable connector included at the end of the lashing may be secured to the flat rack from which the means for wrapping lashings is omitted before placing the flat racks 10 on the shipping containers 22.

In the embodiment of FIG. 3, additional lashings, shown in dashed line in FIG. 3, can be secured between a flat rack located on one side of the stack of shipping containers (e.g., on the left side of FIG. 3) and a foundation that includes a plate bolted or welded on the lashing bridge 16 or on the deck 18 on the opposite side (e.g., on the right side of FIG. 3) and a releasable connector.

Figure 4:
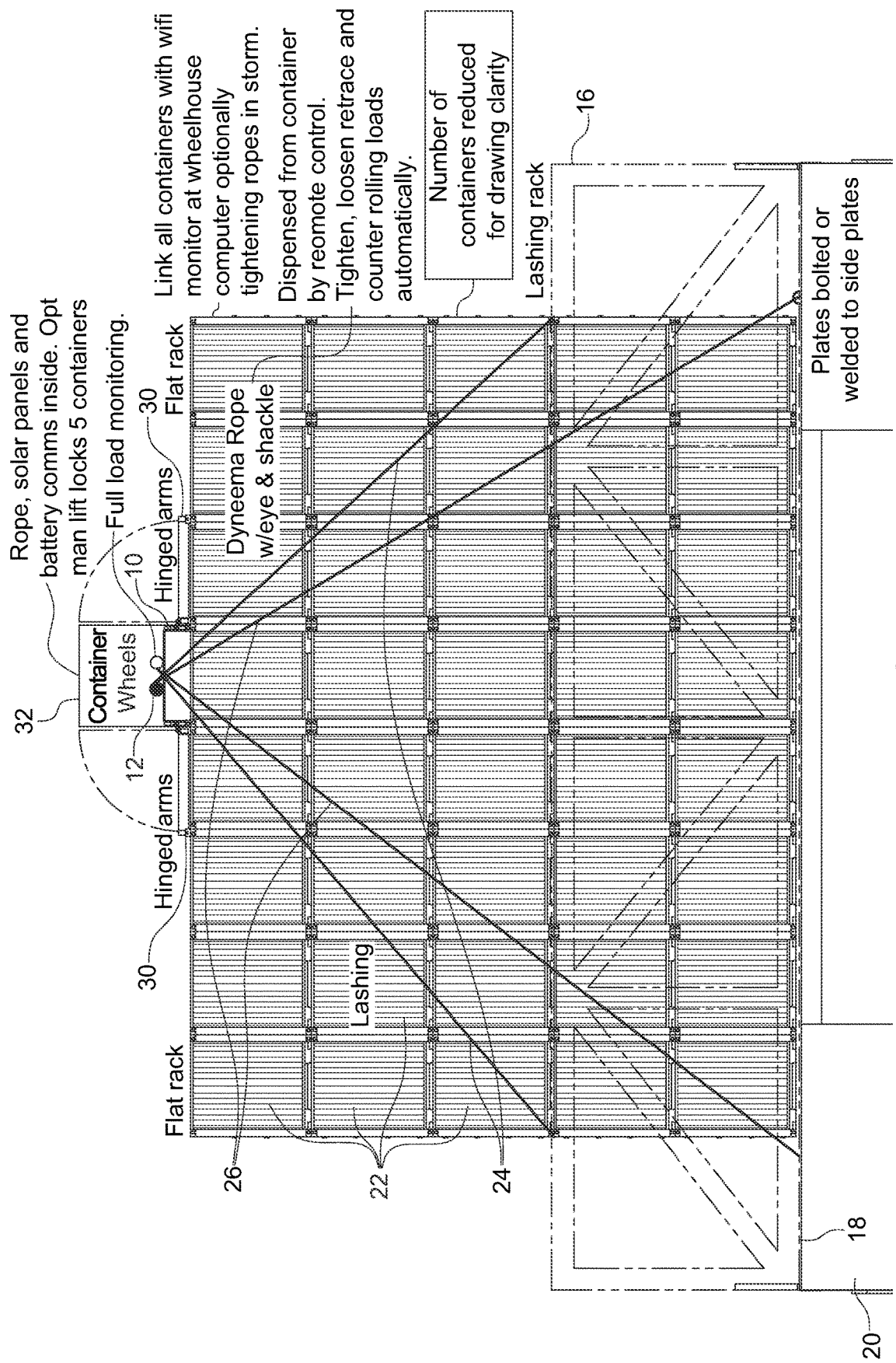
FIG. 4 is an elevation view of a portion of a cargo ship including a lashing bridge and a supplementary lashing system illustrating an alternative configuration of a support portion of the lashing system.

FIG. 4 shows an alternative embodiment with optional hinge arms 30. The hinge arms 30 may be lowered by an operator to be secured to shipping containers 22 that are adjacent to a shipping container onto which a flat rack 10 has been placed. As such, the hinge arms 30 may spread the tension applied by the lashings 24 and/or 26 over up to five shipping containers 22.

The alternative embodiment shown in FIG. 4 is also provided with optional load monitoring and optional automatic tightening or loosening of the lashings based on the monitored loads, ship roll/pitch, and/or other measurements indicative of the state of the sea. For example, measurements of the ship's pitch and roll, loads between shipping containers, tension in the lashings, or acceleration of one or more of the flat racks 10 can be broadcasted wirelessly to a wheelhouse 32 (e.g., a 20-feet shipping container), where a computer is installed. The computer is optionally programmed to automatically adjust the tension of lashings in real-time by actuating a winch mounted on the same flat rack as the wheelhouse 32. Alternatively or additionally, the measurements of the ship's pitch and roll, loads between shipping containers, tension in the lashings, or acceleration of the support can be broadcasted wirelessly to a computer located in a room in the cargo ship, where these measurements can be monitored by an operator.

The wheelhouse 32 may protect the computer from inclement weather. The wheelhouse 32 may also protect electric motors coupled to winches, batteries, and/or electronics for recharging the batteries, such as with solar panels.

While the computer is described as being located in the wheelhouse 32 in FIG. 4, the computer may be a distributed system, optionally partially located in the wheelhouse 32 and in a monitoring room of the cargo ship.

Figure 5:
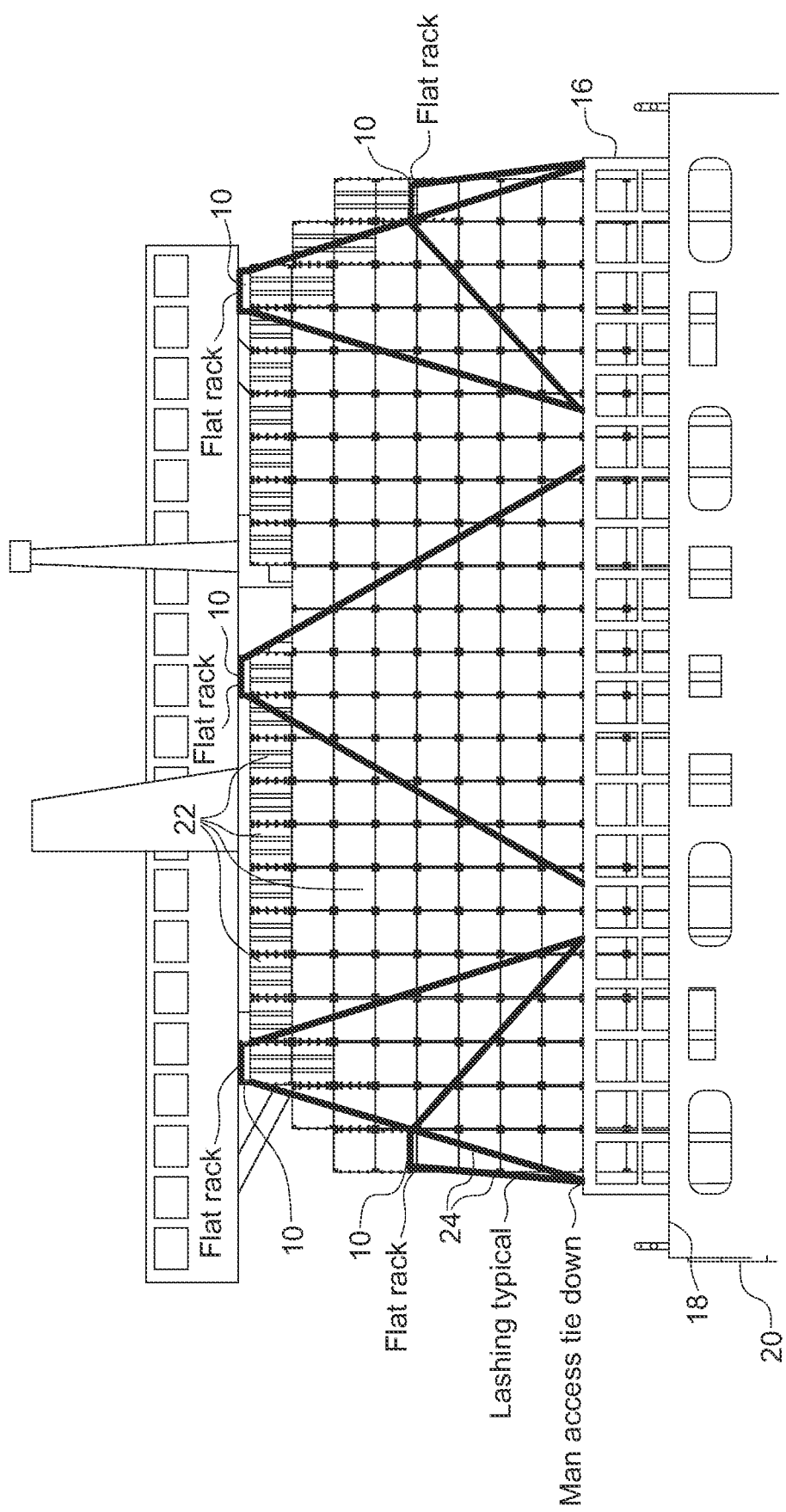
FIGS. 5 and 5A are elevation views of a portion of a cargo ship including a lashing bridge and a supplementary lashing system illustrating yet other configurations of the lashing system.

FIG. 5 shows a configuration where the top of the shipping container stack is not flat, and some flat racks are secured at a lower height than other flat racks. For example, two flat racks 10 are shown positioned on the side of the shipping container stack. Generally, the supplementary lashing system can be used for stabilizing shipping container stacks of any shape, and the positioning of the supports is not limited to the shipping containers 22 located at the highest height of the stack.

Figure 5A:
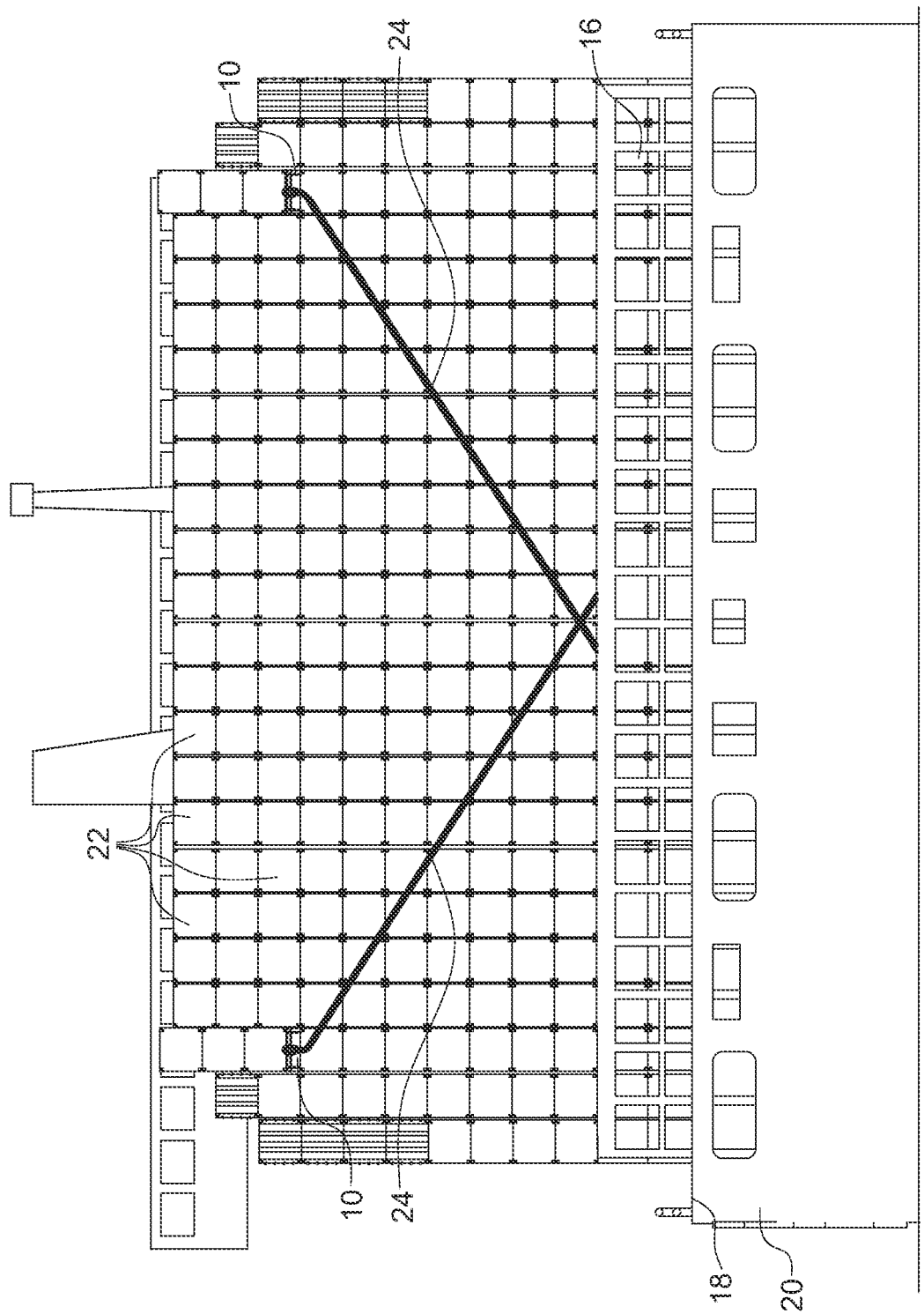

FIG. 5A shows a configuration where some flat racks 10 are secured at a lower height than the top of a column of stacked shipping containers 22. The flat rack(s) 10 can be secured to some of the upper shipping containers with additional shipping containers placed on top of the flat rack(s) 10. For example, the flat racks 10 can be located at around the 7th or 8th level of the stacked containers 22 rather than being located on top of stacked containers 22. The additional containers placed on top of the flat rack(s) 10 can be secured to the flat rack(s) 10 using the interlocking system of the shipping containers. The configuration illustrated in FIG. 5A can still be effective for stabilizing shipping containers stored on a cargo ship because the one or two levels of containers above the flat rack may not need any bracing. As such, the length of the lashing(s) 24 (or other lashings secured to the deck 18 of the cargo ship 20) may not be required to be quite as adjustable as if the flat rack(s) 10 were located on top of stacked containers 22.

Figure 6:
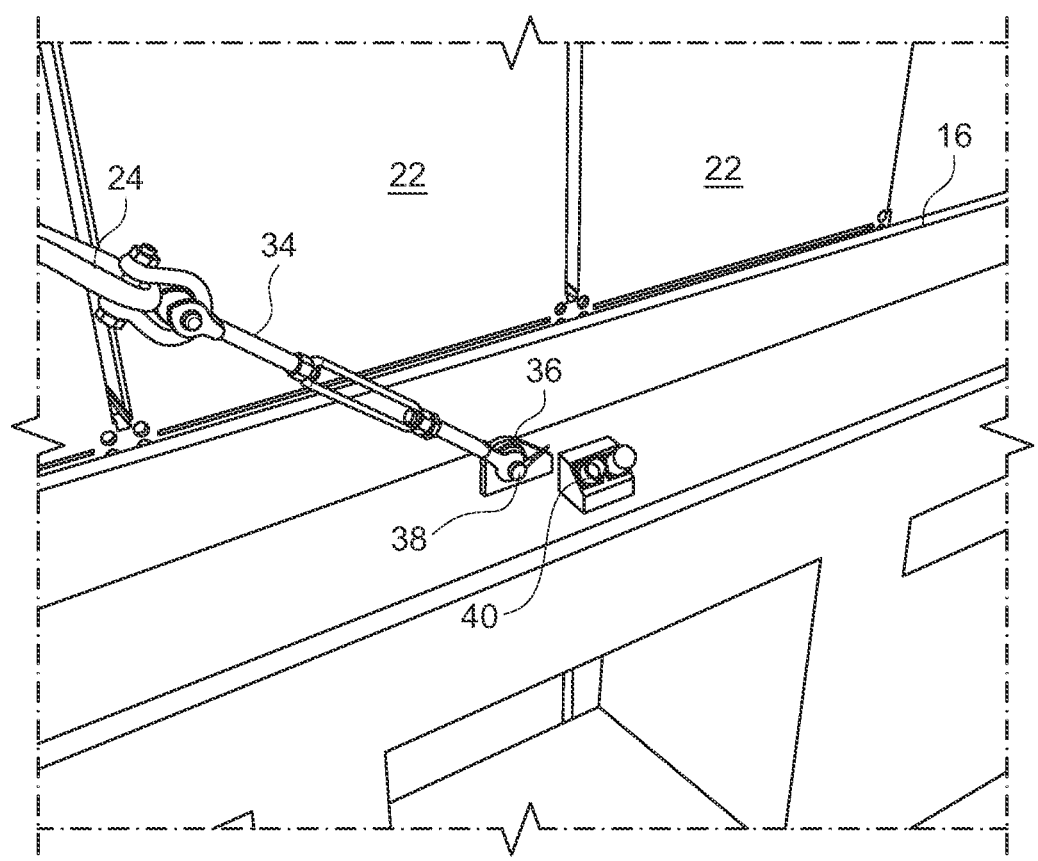
FIG. 6 is a perspective view of a foundation portion of a lashing system.

FIG. 6 illustrates a turnbuckle 34 included at the end of a lashing 24. The turnbuckle 34 is coupled to the lashing bridge 16 of the cargo ship via a foundation (e.g., a plate) that may be welded or otherwise attached to the lashing bridge 16 and an eye, which together form a pad eye 36. Another releasable connector that is mounted on the foundation may be used instead of the pad eye 36. The turnbuckle 34 can alternatively be coupled to the ship deck 18. The turnbuckle 34 may be used to adjust the tension in the lashing 24 in addition to, or in replacement of, the winches 12 shown in FIGS. 1-4.

FIG. 6 also illustrates a load pin 38 that can be used to monitor the tension in the lashing 24. Measurements performed by the load pin 38 may be broadcasted to other locations using the Wi-Fi terminal 40, which is fixedly coupled to the cargo ship (e.g., to the lashing bridge 16 of the cargo ship).

The housing of the Wi-Fi terminal 40 may also protect an accelerometer and/or gyroscope that can be used to determine the ship's pitch and roll. The measurements performed by the accelerometer and/or gyroscope can also be broadcasted using the Wi-Fi terminal 40.

Figure 7:
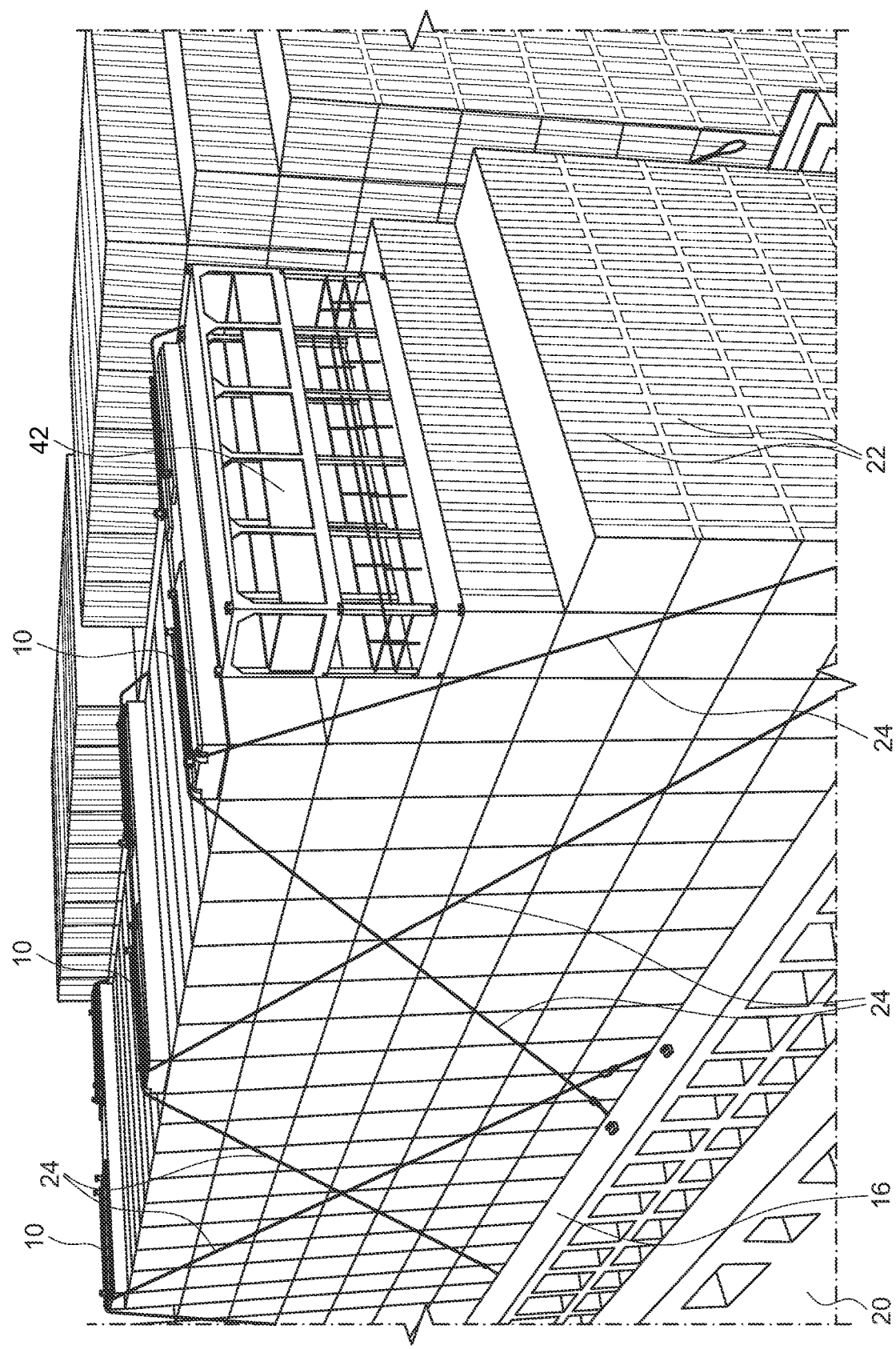
FIG. 7 is a perspective view of a portion of a cargo ship including a lashing bridge and a supplementary lashing system illustrating another alternative configuration of a support portion of the lashing system.

FIG. 7 illustrates an alternative embodiment where means for wrapping the plurality of lashings are bollards or equivalent structures, such as trunnions, that are mounted on the flat racks 10, and the winch may be omitted. Examples of bollards or trunnions are further described in FIG. 8. Fairleads or equivalent structures, such as chocks or pad eyes, may be used instead of, or in addition to, bollards or trunnions to implement the means for wrapping the plurality of lashings.

Also, a lashing cage 42 is shown stored on top of one of the flat racks 10, such as during the trip of the cargo ship. The lashing cage 42 may be lifted by a crane and used to safely transport operators on top of the flat racks. There, the operators can wrap or unwrap the lashing around the bollards or trunnions to coarsely adjust the unwrapped length of the lashing. The tension of the lashing can be finely adjusted by operators using, for example, the turnbuckle 34 shown in FIG. 6. As a lashing cage may not be available in every harbor where the cargo ship loads or unloads shipping containers, the lashing cage can be left on the stack of shipping containers during the trip of the cargo ship. The lashing cage 42 is further described in FIG. 9.

Figure 8:
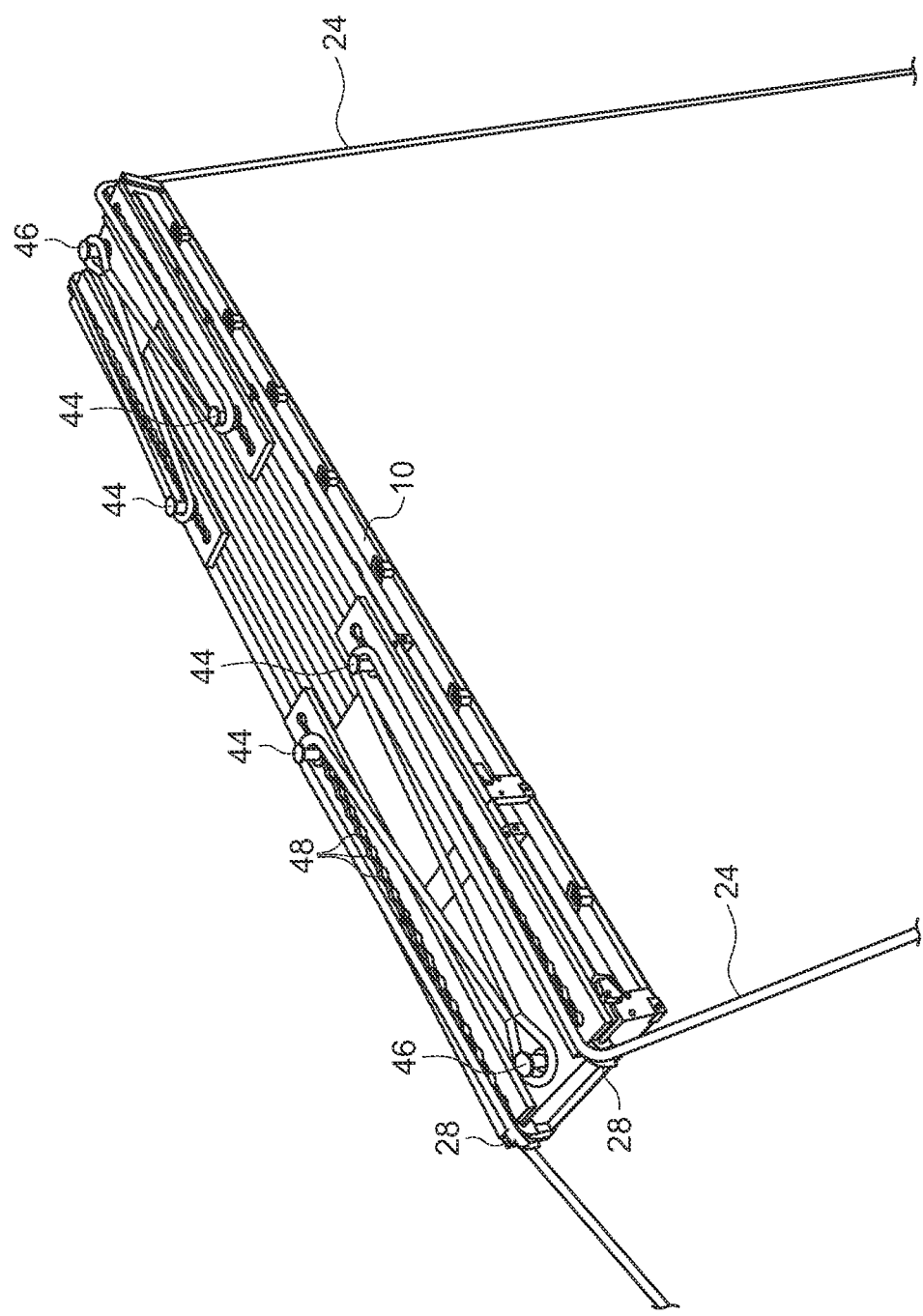
FIG. 8 is a perspective view of a configuration of a support portion of a lashing system, for example, the configuration of the support portion of the lashing system shown in FIG. 7.

FIG. 8 illustrates a flat rack 10 with several bollards or trunnions 44, 46. The position of some of the bollards (e.g., the bollards 44) can be adjusted by moving them to another socket 48 provided between a pair of castellated rails. Other bollards (e.g., the bollards 46) can be fixedly mounted on the flat rack 10. In use, an operator can adjust the position of one of a pair of bollards (e.g., one of the bollards 44) relative to the position of the other of the pair of bollards (e.g., one of the bollards 46). As such, the operator can adjust the length of each half loop of lashing wrapped around the pair of bollards. Then, the operator can coarsely adjust the unwrapped length of the lashing by wrapping a portion of the lashing around the pair of bollards.

In FIG. 8, only two lashings, 24 having a middle noose, are illustrated; however, four (or more) lashings, each having an end noose, may be utilized instead. Four bending shoes 28 are used to guide the lashings 24; however, fewer or more bending shoes may be provided on a flat rack 10. While the nooses are shown encircling the fixed bollards 46, other configurations are possible.

Figure 9:
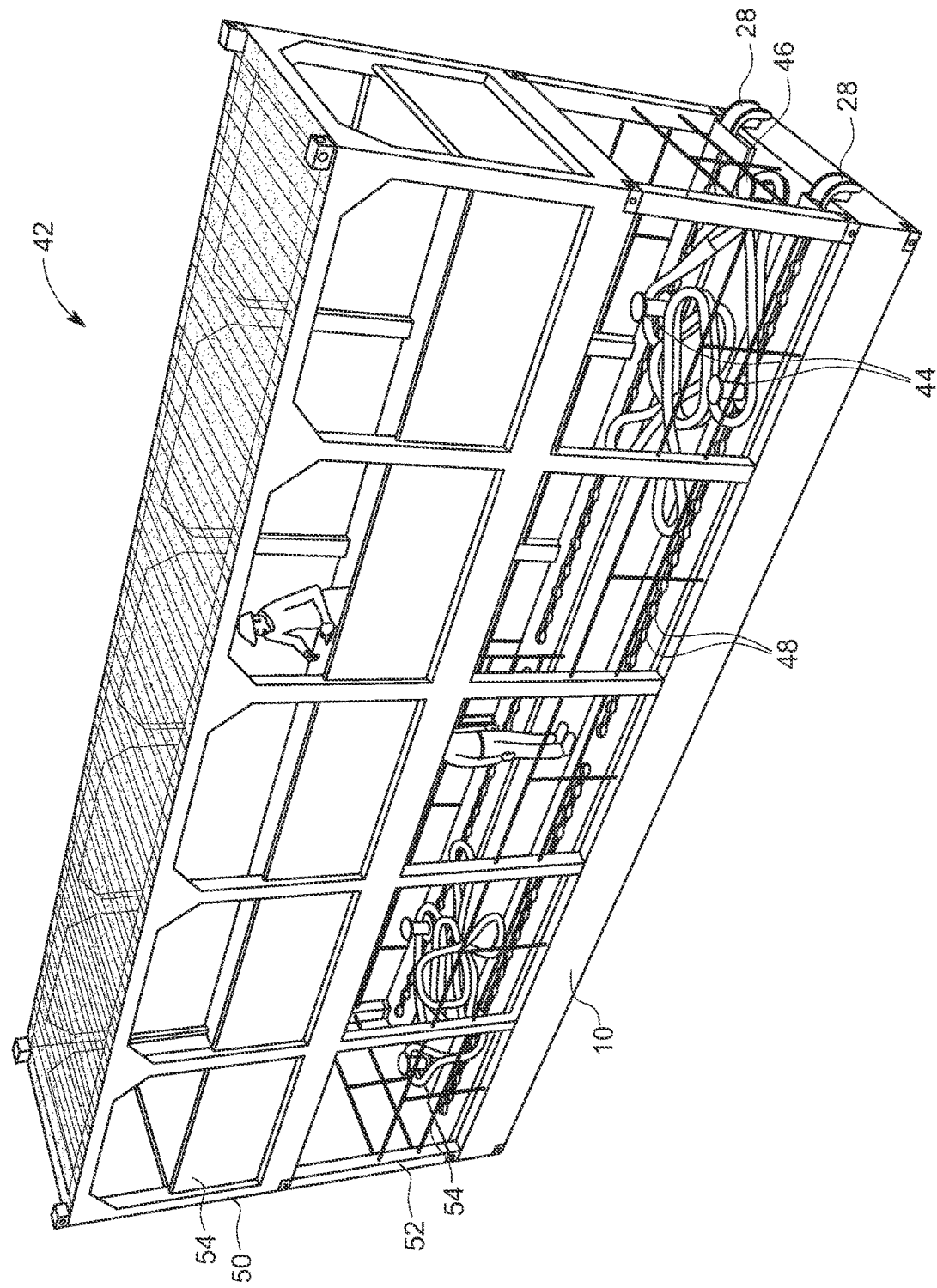
FIG. 9 is a perspective view of a lashing cage, for example, the lashing cage shown in FIG. 7.

FIG. 9 illustrates a lashing cage 42 connected on top of a flat rack 10. The lashing cage 42 may comprise an interlocking system provided on shipping containers as an example means for connecting the lashing cage to a crane; however, any known means for connecting the lashing cage to a crane may be used. The lashing cage 42 comprises a lower level 52 and an upper level 50. The lower level is at least partially floorless so that operators can access the bollards 44, 46 when the lashing cage 42 is connected on top of the flat rack 10, adjust the position of the bollards 44, and wrap or unwrap lashing around the bollards. The upper level 50 has a floor; however, the lower level is accessible by the operator from the upper level and vice versa. Operators are typically standing on the upper level 50 when the lashing cage 42 is being lifted by a crane. Both the lower level 52 and the upper level 50 have a handrail 54 to ensure the safety of the operators.

The lashing cage 42 may also be used to transport winches that can be used to assist with the deployment of the lashing until the releasable connector at the end of the lashing is secured.

The lashing cage 42 can also be used when a winch 12 is used as a means for wrapping the plurality of lashings. As such, the winches 12 shown in FIGS. 1-4 may be operated manually instead of remotely.

Figure 10:
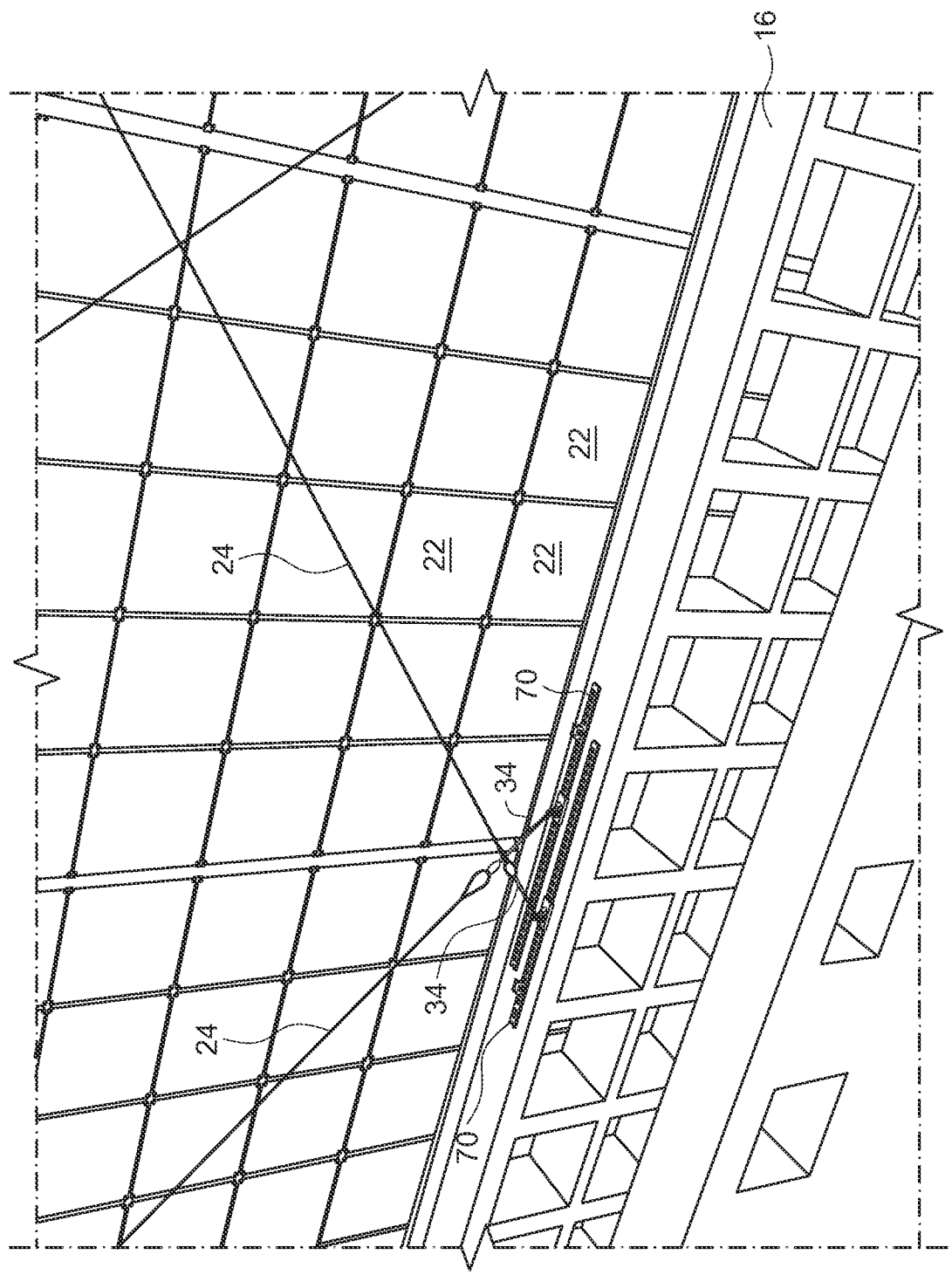
FIG. 10 is a perspective view of a portion of a cargo ship including a lashing bridge and a supplementary lashing system illustrating an alternative configuration of a foundation portion of a lashing system.
Figure 11:
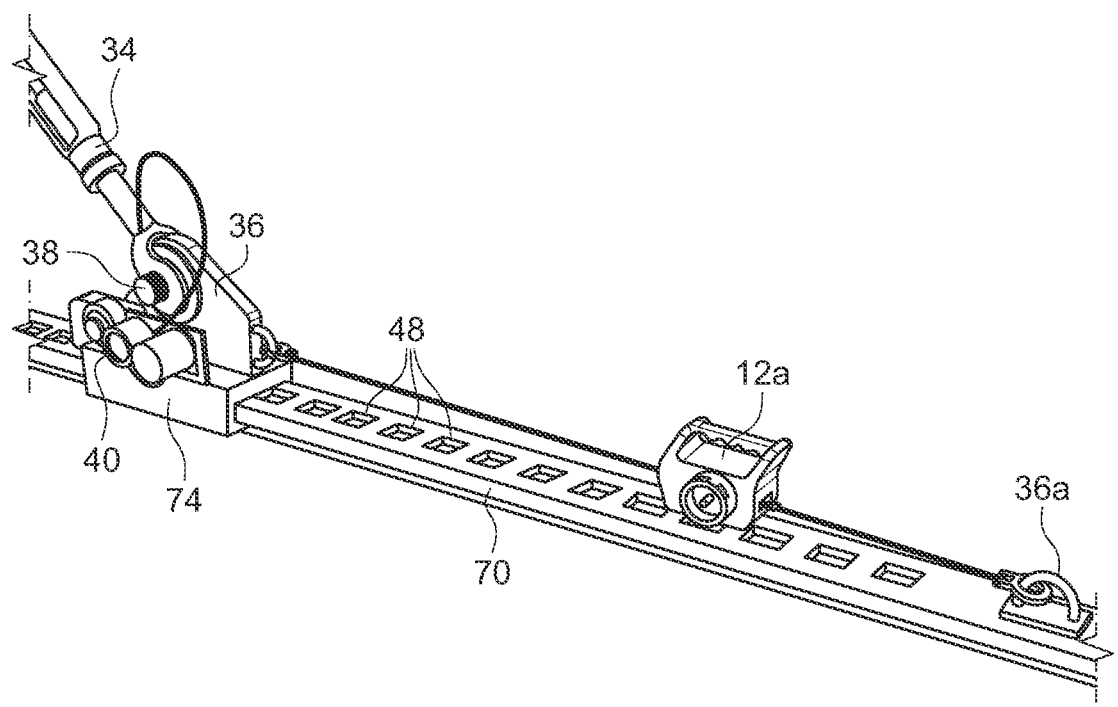
FIGS. 11 and 11A are perspective views of the foundation portion of a lashing system, for example, the lashing system shown in FIG. 10.
Figure 11A:
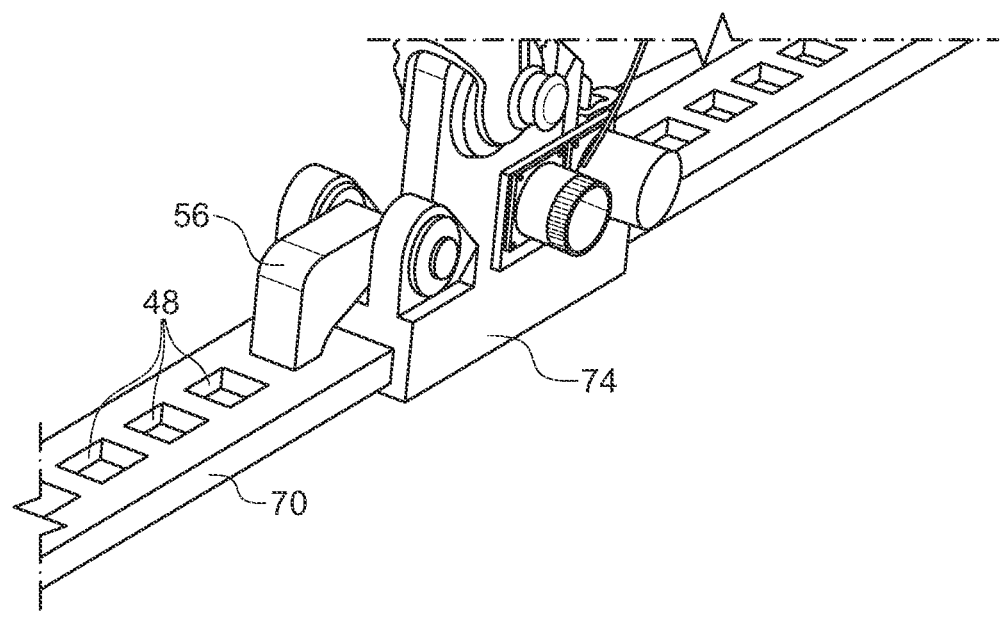

FIGS. 10, 11, and 11A illustrate a portion of a lashing system where the winches 12 may be omitted from the flat rack 10 (not shown). Also, the lashings, such as lashing 24, may be simply attached to the flat rack 10 using a single, and optionally fixed, bollard secured to the flat rack 10. In order to perform the tensioning of the lashings at the level of the deck 18 (not shown) or the lashing bridge 16 (as shown), where access by operators is available.

The lashing system, as shown, includes a ratcheting track 70 adapted to be secured to the lashing bridge 16 and a clamp 74 that is configured to slide on the ratcheting track 70 such that a position of the clamp 74 along the ratcheting track 70 can be locked at one of a plurality of discrete positions by engaging a pawl 56 (shown in FIG. 11A) with one of a plurality of sockets 48. The pawl 56 and sockets 48 are preferably shaped such that movement of the clamp 74 in a direction that would increase the tension in the lashing 24 connected to the clamp 74 causes the pawl 56 to disengage one of the plurality of sockets 48 and engage the next of the plurality of sockets 48. However, movement of the clamp 74 in a direction that would decrease the tension in the lashing 24 is prevented by the shape of the pawl 56 and sockets 48. A portable winch 12A is coupled to a foundation formed by the ratcheting track 70 through a pad eye 36a and is configured to adjust the position of the clamp 74 and pawl 56 along the ratcheting track 70. The winch 12A is driven by an operator and assists the operator in positioning the clamp 74 is a position where the lashing 24 can placed under tension.

In the lashing system, as shown, the lashing 24 is connected to a foundation formed by the ratcheting track 70 via a turnbuckle 34 provided at the end of the lashing 24 and a pad eye 36 that is mounted on the foundation. As such, the turnbuckle 34 and the pad eye 36 form a releasable connection.

Figure 12:
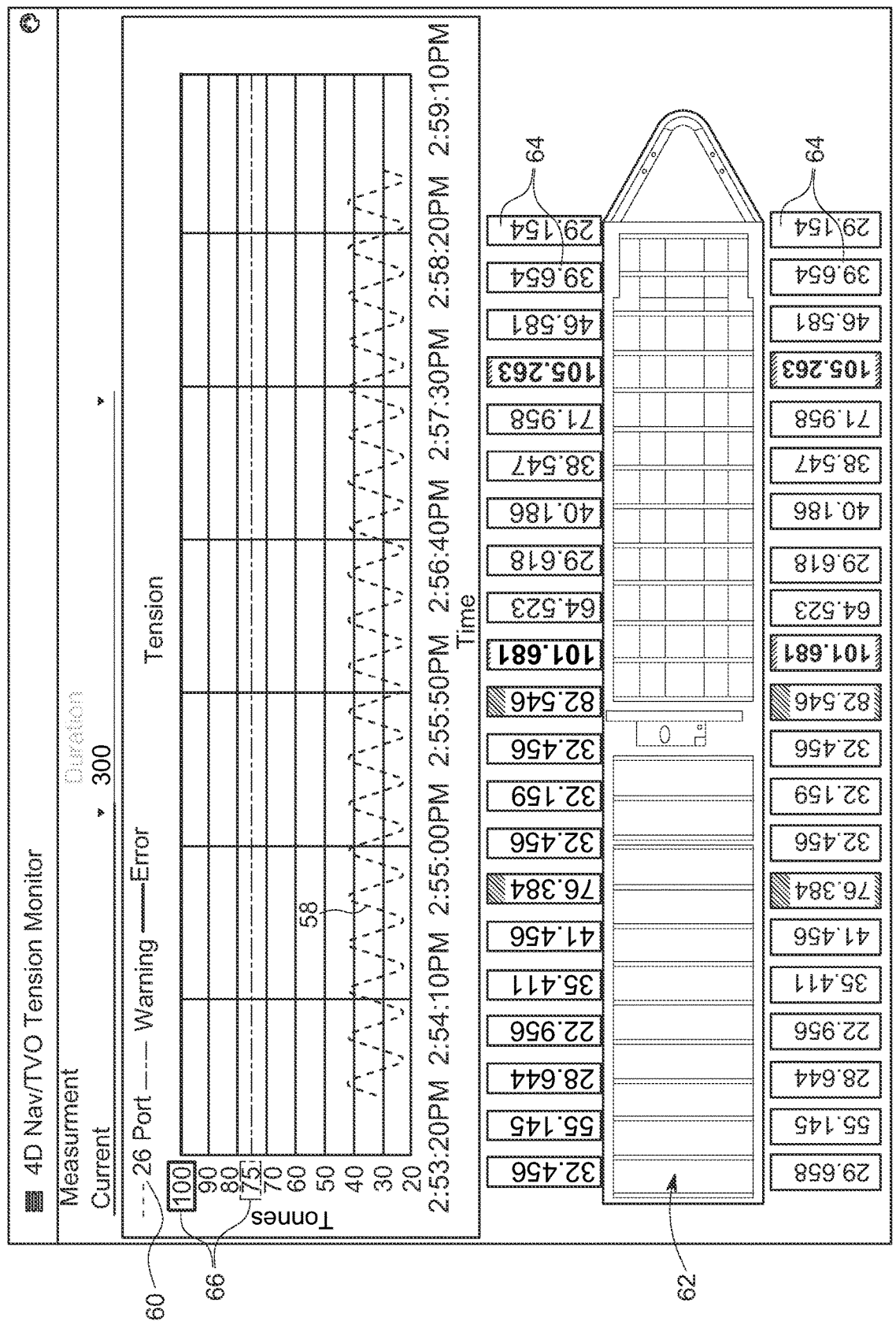
FIG. 12 is a Graphical User Interface illustrating data received during the monitoring of tension in lashings.

FIG. 12 illustrates the monitoring of the tension in a plurality of lashings. A Graphical Unit Interface may include a graph 58 of the tension in a selected one of the plurality of lashings as a function of time. A selector 60 may allow a user to select a particular lashing by its position, such as by selecting the "port" or the "starboard" side, and/or a number indicative of a position along the bow-stern direction on the stack of containers where the flat rack is secured. The Graphical Unit Interface may also include a top schematics 62 of the cargo ship, showing schematically the stacks of containers, and time-averaged or root-median-squared values 64 of the tension measured in the lashings. The magnitude of the values 64 can be color-coded based on preselected thresholds 66, which may or may not be adjusted by the user. The ship's pitch and roll and/or loads between shipping containers can also be visualized on the Graphical Unit Interface. The Graphical Unit Interface may take alternative forms as the one illustrated in FIG. 12.

Figure 13:
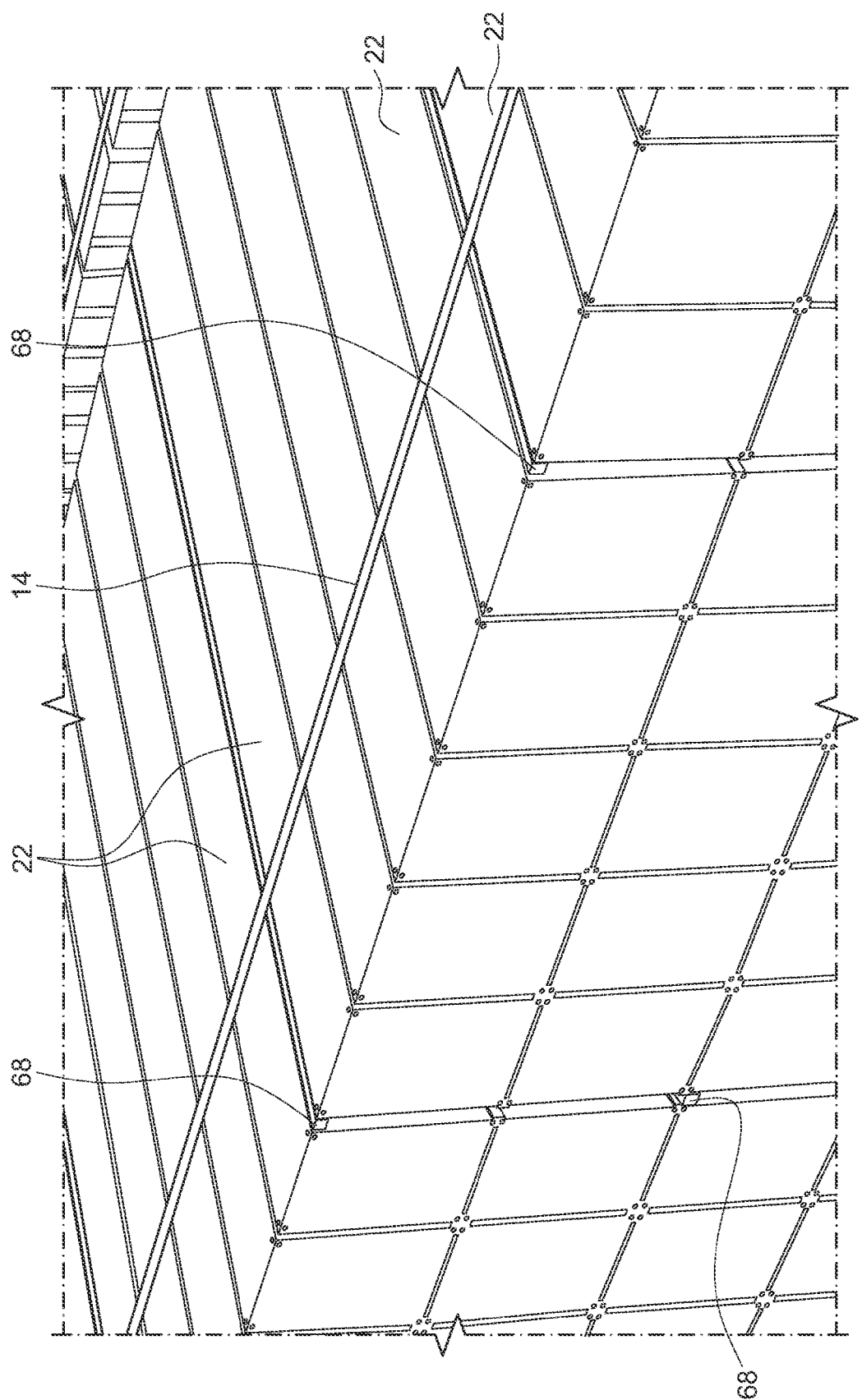
FIG. 13 is a perspective view of a stack of containers where spacers or bumpers are disposed between containers.

FIG. 13 illustrates an example of the positioning of spacers or bumpers 68 between columns of the stack of containers 22. The spacers or bumpers 68 are preferably shaped to rest on the upper edges of two adjacents containers 22. For example, the spacers or bumpers 68 have a cross-section that is T-shaped. Spacers may be made of a material that is stiffer than bumpers. Spacers and bumpers can be used in conjunction. The spacers or bumpers 68 can allow the container stack to be pre-loaded from both sides when tension is applied to the lashings, for example, the lashings 24. As shown, the spacers or bumpers 68 span an entire length of the containers 22; however, in other embodiments, the spacers or bumpers 68 may span less than the entire length of the containers 22. Also, more than one spacer or bumper 68 may be located along one edge of a container 22.

Figure 14:
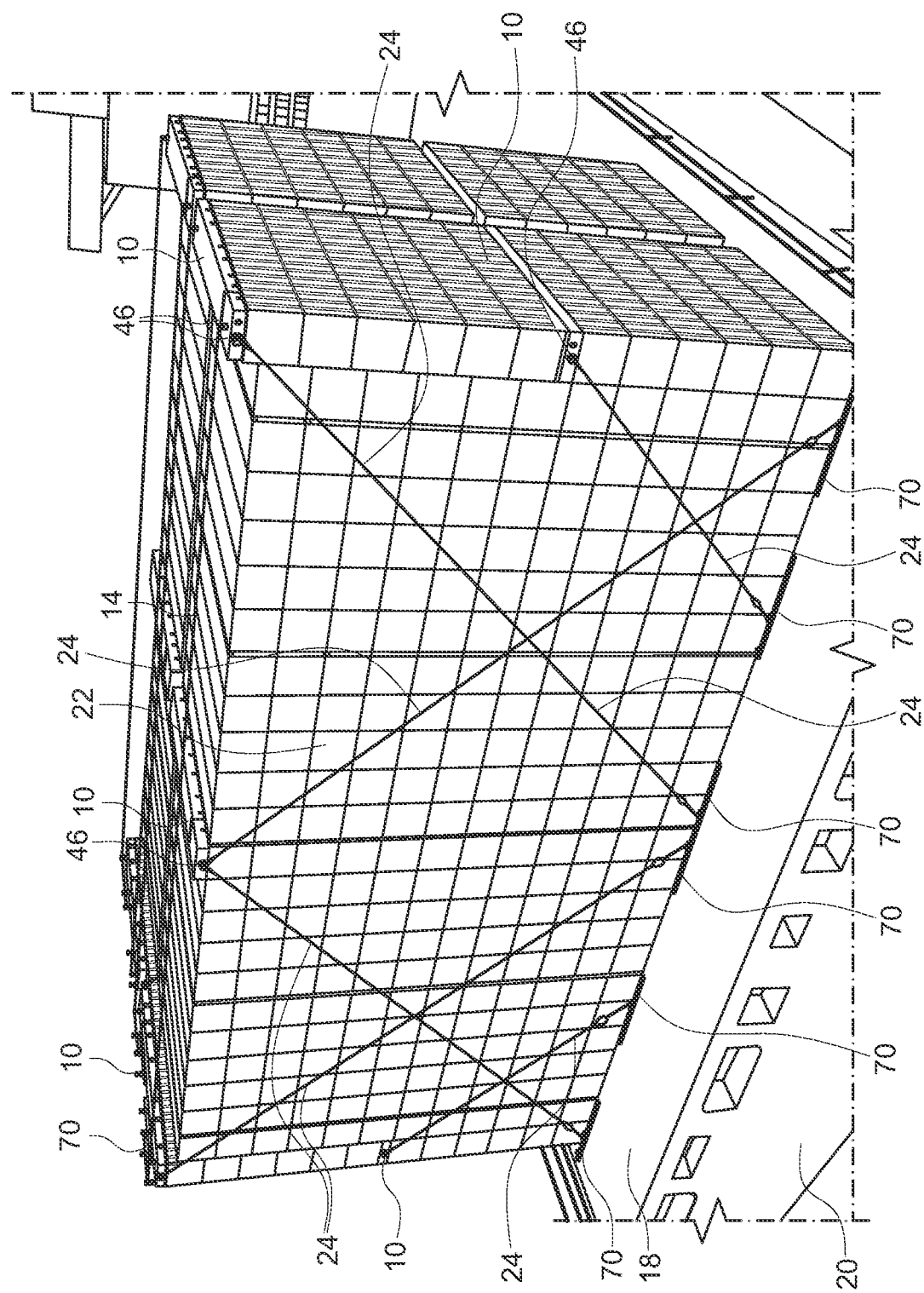
FIG. 14 is an elevation view of a portion of a cargo ship including a lashing system illustrating a configuration of the lashing system usable without lashing bridges.

FIG. 14 illustrates a configuration of a lashing system that is usable on a cargo ship 20 without lashing bridges. However, the configuration of the lashing system shown in FIG. 14 can alternatively be used on a cargo ship with lashing bridges.

Some lashings (e.g., the lashing 14) are secured between a pair of flat racks 10 positioned in the stack of containers 22, for example, on top of the stack of containers 22. One of the pair of flat racks 10 includes a bollard or trunnion 46. The other of the pair of flat racks 10 includes a tensioner, similar to the tensioner described in FIGS. 11 and 11A. Other lashings (e.g., the lashings 24) are secured between a flat rack 10 and the deck 18 of the cargo ship.

Some flat racks 10 are secured at a lower height than the top of a column of stacked shipping containers 22, in a way similar to the configuration shown in FIG. 5A.

Figure 15:
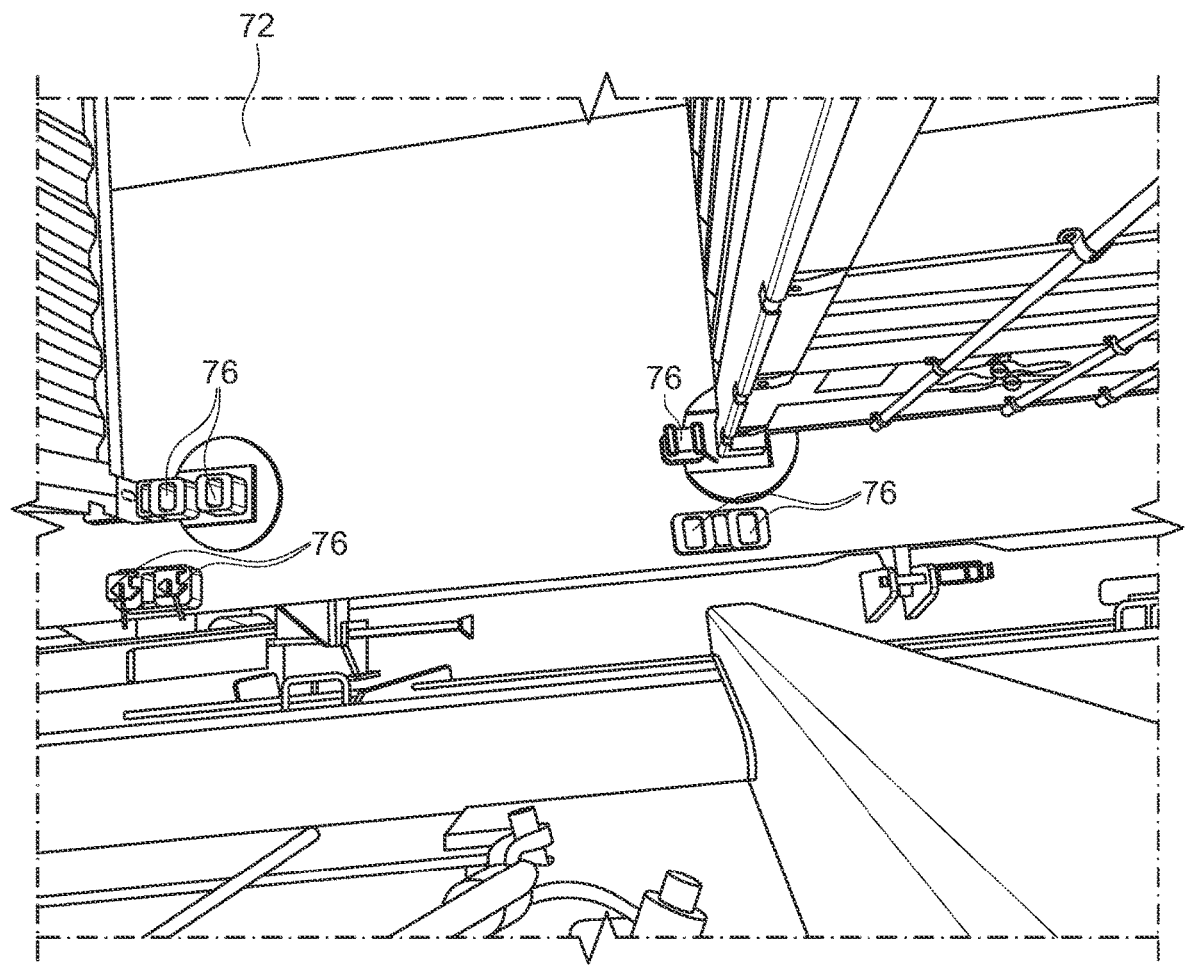
FIG. 15 is a top view of a hatch cover of a cargo ship that includes connectors capable of receiving twist-locks or other equivalent interlocking systems and/or a foundation portion of a lashing system.

FIG. 15 illustrates a hatch cover 72 secured to the deck 18 of a cargo ship. The hatch cover 72 includes shipping container connectors 76 that are capable of interfacing the twist-locks or other equivalent interlocking systems usually provided on shipping containers. The shipping container connectors 76 may be positioned to receive 40-feet containers, or 20-fee containers, which are usually offset from the positions of the 40-feet containers.

The hatch cover 72, including the connectors 76, can also be utilized to secure a foundation of a lashing system to the deck 18 of the cargo ship. For example, in the embodiments where the foundation is formed by a ratcheting track (e.g., the ratcheting track 70 shown in FIGS. 11 and 11A), a lower surface of the ratcheting track may include twist-locks or other equivalent interlocking systems suitably spaced to interlock with connectors 76. In other embodiments, other types of foundations (e.g., a plate) may include twist-locks or other equivalent interlocking systems suitably spaced to interlock with connectors 76. As such, a tensioning system can be releasably coupled to the deck 18 of the cargo ship.

Additionally, the disclosure also contemplates at least the following embodiments:

Embodiment 1

Embodiment 1 is a lashing apparatus for use on cargo ships transporting shipping containers, the apparatus comprising a support capable of interfacing with an interlocking system of one or more shipping containers, and a lashing couplable to the support and having an end connectable, either directly or indirectly, to another shipping container or to a structure of the cargo ship.

The support may generally comprise a flat rack or a platform, any of which can interface via twist-locks or other equivalent interlocking systems of a shipping container.

The lashing may generally comprise a rope sold under the trademark Dyneema or other stiff, strong, and/or light, flexible members.

Embodiment 2

Embodiment 2 is a lashing apparatus as described in embodiment 1, further comprising a tensioner capable of applying tension to the lashing such as to reduce movement of the support.

The tensioner may generally comprise one or more of a turnbuckle attached to one end of the lashing, a ratchet system couplable to one end of the lashing, a winch attached to one end of the lashing, or a wrapping system couplable to one end of the lashing and including a rail capable of securing at least two elements selected from the group consisting of bollards, trunnions, or fairleads.

Embodiment 3

Embodiment 3 is a lashing apparatus as described in embodiment 2, wherein the tensioner is secured, either directly or indirectly, to the support.

Embodiment 4

Embodiment 4 is a lashing apparatus as described in embodiment 2, wherein the tensioner is secured, either directly or indirectly, to a structure of the cargo ship.

The structure of the ship may generally comprise a lashing bridge, a lashing tie-rod, or a deck of the cargo ship.

Embodiment 5

Embodiment 5 is a lashing apparatus as described in any of embodiments 1 to 4, further comprising a first releasable connector mounted, directly or indirectly, on a lashing bridge, a lashing tie-rod, or a deck of the cargo ship, and a second releasable connector included at the end of the lashing and adapted to be releasably coupled to the first releasable connector.

The first releasable connector may generally comprise any known rigging hardware useable for releasably connecting the first releasable connector to the second releasable connector, such as an eye, a shackle, a turnbuckle, or a hook.

The second releasable connector may generally comprise any known rigging hardware useable for releasably connecting the second releasable connector to the first releasable connector, such as an eye, a shackle, a turnbuckle, or a hook, that is capable of releasably connecting an end of the lashing to the first releasable connector.

Embodiment 6

Embodiment 6 is a lashing apparatus as described in any of embodiments 1 to 5, further comprising a foundation that is used as part of a connection of the end of the lashing to another shipping container or to a structure of the cargo ship.

The foundation may generally comprise a plate bolted or welded, either directly or indirectly, on the structure of the cargo ship, a ratcheting track bolted or welded, either directly or indirectly, on the structure of the cargo ship, another flat rack or platform that can interface via twistlocks or other equivalent interlocking systems of a shipping container, or a lashing tie-rod connected to a shipping container.

Optionally, the foundation can be releasably attached to a deck of a cargo ship via shipping container connectors provided on a hatch cover. The shipping container connectors are capable of interfacing with twist-locks or other equivalent interlocking systems.

Embodiment 7

Embodiment 7 is a lashing apparatus as described in any of embodiments 1 to 5, further comprising a foundation that is used to mount the tensioner.

The foundation may generally comprise a plate bolted or welded, either directly or indirectly, on the structure of the cargo ship, a ratcheting track bolted or welded, either directly or indirectly, on the structure of the cargo ship, or another flat rack or platform that can interface via twist-locks or other equivalent interlocking systems of a shipping container, or a lashing tie-rod connected to a shipping container.

Embodiment 8

Embodiment 8 is a lashing apparatus as described in any of embodiments 1 to 7, wherein the lashing apparatus supplements a standard lashing system.

The standard lashing system may generally comprise lashing bridges, and/or lashing tie-rods or other devices provided on the cargo ship.

Embodiment 9

Embodiment 9 is a lashing apparatus as described in any of embodiments 1 to 7, wherein the lashing apparatus is used as a stand-alone system on a cargo ship that does not include lashing bridges.

Embodiment 10

Embodiment 10 is a lashing apparatus as described in any of embodiments 1 to 9, further comprising either an accelerometer coupled to the support, or a load pin coupled to the lashing, preferably at a releasable connection included at the end of the lashing, and capable of measuring tension in the lashing, or both.

Embodiment 11

Embodiment 11 is a lashing apparatus as described in embodiment 10, wherein the accelerometer or the load pin is connected to a computer.

The accelerometer or the load pin may be connected to the computer via wires, but is preferably at least partially wirelessly connected to the computer.

Embodiment 12

Embodiment 12 is a lashing apparatus as described in embodiment 11, wherein the accelerometer or the load pin is wired to a Wi-Fi terminal, and the Wi-Fi terminal is connected to the computer.

Embodiment 13

Embodiment 13 is a lashing apparatus as described in embodiment 11 or 12, wherein the computer is programmed to drive a winch to automatically adjust the tension of the lashing attached to the winch based on data received from the accelerometer or the load pin.

Embodiment 14

Embodiment 14 is a lashing apparatus as described in embodiment 11, 12, or 13 wherein the computer further receives data indicative of measurements of the ship's pitch and roll, or one or more loads between shipping containers, or both, and the computer is programmed to drive a winch to automatically adjust the tension of the lashing attached to the winch based also on the data indicative of measurements of the ship's pitch and roll, or one or more loads between shipping containers.

Embodiment 15

Embodiment 15 is a lashing apparatus as described in any of embodiments 11 to 14, wherein the computer is programmed to display data received from the accelerometer, or the load pin, or measurements of the ship's pitch and roll, or measurements of one or more loads between shipping containers.

Embodiment 16

Embodiment 16 is a lashing apparatus as described in any of embodiments 1 to 15, wherein the tensioner comprises a ratcheting track having a plurality of sockets and a clamp that is configured to slide on the ratcheting track such that a position of the clamp along the ratcheting track can be locked at one of a plurality of discrete positions by engaging a pawl with one of the plurality of sockets.

Embodiment 17

Embodiment 17 is a lashing apparatus as described in embodiment 16, wherein the tensioner further comprises a turnbuckle that has an adjustable length.

Embodiment 18

Embodiment 18 is a lashing apparatus as described in any of embodiments 16 or 17, further comprising a winch, wherein the winch is configured to adjust the position of the pawl.

The winch may generally be mounted on the support, or on the foundation, if provided.

Embodiment 19

Embodiment 19 is a lashing apparatus as described in any of embodiments 1 to 18, comprising a bollard, trunnion, or fairlead that is used to attach the lashing.

The bollard, trunnion, or fairlead may generally be mounted on the support, or on the foundation, if provided. The bollard, trunnion, or fairlead may, or may not, be attached to a pin to allow moving a position of the bollard, trunnion, or fairlead.

Embodiment 20

Embodiment 20 is a lashing apparatus as described in any of embodiments 1 to 19, comprising a hinged arm that is mounted to the support to provide additional points for securing the support to a stack of shipping containers.

Embodiment 21

Embodiment 21 is a lashing system comprising at least two, and preferably more than two apparatuses as described in embodiments 1 to 20.

Embodiment 22

Embodiment 22 is a lashing system as described in embodiment 21, comprising at least a first apparatus secured to a first shipping container and to a second shipping container, and at least a second apparatus secured to a third shipping container and to a structure of the cargo ship.

The third shipping container may generally be the same shipping container as the second shipping container or may be a shipping container different from the second shipping container.

Embodiment 23

Embodiment 23 is a lashing system as described in embodiment 21 or 22, wherein the support of at least one of the lashing apparatus interfaces with an interlocking system of a shipping container located in the first, the second, the next-to-last, or the last columns (i.e., one of the side columns) of a stack of shipping containers.

Embodiment 24

Embodiment 24 is a lashing system as described in any of embodiments 21 to 23 wherein one or more shipping containers are located on top of the support.

The one or more shipping containers placed on top of the support can generally be secured to the support using the interlocking system of the shipping containers or a lashing tie-rod.

Embodiment 25

Embodiment 25 is a lashing system as described in any of embodiments 21 to 24, comprising spacers or bumpers provided between columns of the stack of containers in order to allow the container stack to be pre-loaded from both sides.

Embodiment 26

Embodiment 26 is a lashing cage, comprising a lower level having a handrail, the lower level being at least partially floorless, an upper level having a handrail, the upper level having a floor, the lower level being accessible by the operator from the upper level, and means for connecting the lashing cage to a crane.

The means for connecting the lashing cage to a crane may generally comprise any known means for connecting the lashing cage to a crane, for example, an interlocking system provided on shipping containers.

Embodiment 27

Embodiment 27 is a lashing cage as described in embodiment 26, comprising a winch capable of deploying a lashing.

Embodiment 28

Embodiment 28 is a method of stabilizing shipping containers stored on a cargo ship, comprising the steps of providing a lashing apparatus as described in any of embodiments 1 to 20, and using the lashing apparatus to reduce movement of the support.

Embodiment 29

Embodiment 29 is a method of stabilizing shipping containers stored on a cargo ship, comprising the steps of providing a lashing system as described in any of embodiments 21 to 25, and using the lashing system to reduce movement of the support.

Embodiment 30

Embodiment 30 is a method of stabilizing shipping containers stored on a cargo ship as described in embodiment 28 or 29, comprising the step of lifting a support and placing it on a stack of shipping containers using the same crane as the crane used for loading and unloading the shipping containers.

Embodiment 31

Embodiment 31 is a method of stabilizing shipping containers stored on a cargo ship as described in embodiment 28, 29, or 30, comprising the step of transporting an operator to a support using a lashing cage as described in embodiment 26 or 27.

Embodiment 32

Embodiment 32 is a Graphical User Interface programmed to display data received by a computer as described in any of embodiments 11 to 15.

Embodiment 33

Embodiment 33 is a method of stabilizing shipping containers stored on a cargo ship as described in any of embodiments 28 to 31, comprising the step of displaying data received by the computer as described in any of embodiments 11 to 15 using a Graphical User Interface as described in embodiment 32.

Embodiment 34

Embodiment 34 is a method of stabilizing shipping containers stored on a cargo ship comprising the steps of providing a lashing apparatus as described in any of embodiments 1 to 25, and releasably attaching a foundation of the lashing apparatus to a deck of the cargo ship via shipping container connectors provided on a hatch cover. The shipping container connectors are capable of interfacing with twist-locks or other equivalent interlocking systems. Optionally, the foundation is formed by a ratcheting track.

The disclosure is susceptible to various modifications and alternative forms. Specific embodiments thereof are shown by way of example in the drawings and description. It should be understood, however, that the drawings and detailed description thereto are not intended to limit the scope of the invention to the particular form disclosed. However, on the contrary, the intention is to cover all modifications, equivalents, and alternatives falling within the scope of the claims.

What is claimed is:

1. A method of stabilizing shipping containers stored on a cargo ship, comprising:
    providing a lashing apparatus including a support capable of interfacing with an interlocking system of one or more shipping containers, a lashing, a track, and a clamp configured to slide on the track;
    securing the support to one or more shipping containers;
    coupling the lashing to the support;
    connecting an end of the lashing to the clamp;
    securing the track to another shipping container or to a structure of the cargo ship; and
    adjusting a position of the clamp along the track.

2. The method of claim 1, further comprising applying tension to the lashing so as to reduce movement of the support.

3. The method of claim 1,
    wherein the track includes a plurality of sockets, and
    the method further comprising locking the clamp along the track at one of a plurality of discrete positions.

4. The method of claim 3,
    wherein the track is a ratcheting track, and the clamp includes a pawl; and
    the method further comprising securing the ratcheting track to at least one of the support, a lashing bridge or a deck of the cargo ship; and adjusting a position of the pawl along the ratcheting track by engaging the pawl with one of the plurality of sockets.

5. The method of claim 3,
    wherein the end of the lashing includes a turnbuckle; and the method further comprising adjusting a length of the turnbuckle.

6. The method of claim 3,
    wherein adjusting the position of the clamp is performed with a winch coupled to the track.

7. The method of claim 3, wherein securing the track to the other shipping container or to the structure of the cargo ship comprises releasably attaching the track to container connectors provided on a hatch cover.

8. The method of claim 1,
    wherein the lashing apparatus includes means for wrapping the lashing that are mounted on the support;
    the method further comprising wrapping or unwrapping the lashing to the means of wrapping the lashing.

9. The method of claim 8, wherein the means for wrapping the lashing comprise a winch, a bollard attached to a pin, a fairlead attached to a pin, or a combination thereof.

10. The method of claim 9, further comprising adjusting a position of at least one of the means for wrapping the lashing.

11. The method of claim 1, comprising:
    further providing one or more lashing apparatus, each including a support capable of interfacing with an interlocking system of one or more shipping containers, and a lashing.

12. The method of claim 1, further comprising placing one or more shipping containers on top of the support.

13. A method of stabilizing shipping containers stored on a cargo ship, comprising:
    providing a lashing apparatus including a support capable of interfacing with an interlocking system of one or more shipping containers, and a lashing;
    securing the support to one or more shipping containers;
    coupling the lashing to the support;
    connecting an end of the lashing to another shipping container or to a structure of the cargo ship;
    further providing one or more lashing apparatus, each including a support capable of interfacing with an interlocking system of one or more shipping containers, and a lashing;
    lifting a lashing cage to transport an operator to a first support of at least one lashing apparatus, and
    connecting the lashing cage to the first support, the lashing cage comprising:
        a lower level having a handrail, the lower level being at least partially floorless; and
        an upper level having a handrail, the upper level having a floor, the lower level being accessible by the operator from the upper level.

14. A lashing apparatus for use on cargo ships transporting shipping containers, comprising:
    a support capable of interfacing with an interlocking system of one or more shipping containers;
    a lashing couplable to the support and having an end connectable to a clamp; and
    a track adapted to be secured to another shipping container or to a structure of a cargo ship;
    wherein the clamp is configured to slide on the track, and a position of the clamp along the track is adjustable.

15. The lashing apparatus of claim 14, further comprising:
    a tensioner capable of applying tension to the lashing so as to reduce movement of the support.

16. The lashing apparatus of claim 14,
    wherein the track includes a plurality of sockets, and
    wherein the clamp can be locked along the track at one of a plurality of discrete positions.

17. A lashing apparatus for use on cargo ships transporting shipping containers, comprising:
- a support capable of interfacing with an interlocking system of one or more shipping containers;
- a lashing couplable to the support and having an end connectable to another shipping container or to a structure of a cargo ship;
- a foundation adapted to be secured to at least one of a lashing bridge, a lashing tie-rod, or a deck of the cargo ship;
- a first releasable connector mounted on the foundation;
- a second releasable connector included at the end of the lashing and adapted to be releasably coupled to the first releasable connector;
- an accelerometer coupled to the support or a load pin coupled to the foundation and capable of measuring tension in the lashing;
- wherein the accelerometer or the load pin is wirelessly connected to a computer;
- wherein the lashing is attached to a winch, and wherein the computer is programmed to drive the winch to automatically adjust a tension of the lashing based on data received from the accelerometer or the load pin.

18. The lashing apparatus of claim 14, comprising means for wrapping the lashing that are mounted on the support.

19. The lashing apparatus of claim 18, wherein the means for wrapping the lashing comprise one or more of a winch, a bollard attached to a pin, and a fairlead attached to a pin.

20. The lashing apparatus of claim 16,
- wherein the track is a ratcheting track adapted to be secured to at least one of the support, a lashing bridge or a deck of the cargo ship; and
- wherein the clamp includes a pawl; and,
- wherein a position of the pawl along the ratcheting track can be locked by engaging the pawl with one of the plurality of sockets.

21. The lashing apparatus of claim 16, wherein the end of the lashing includes a turnbuckle that has an adjustable length.

22. The lashing apparatus of claim 16, further comprising a winch coupled to the track, wherein the winch is configured to adjust the position of the clamp.

23. The lashing apparatus of claim 18, wherein a position of at least one of the means for wrapping the lashing mounted on the support is adjustable.

24. The lashing apparatus of claim 23, wherein the support includes a plurality of sockets, each sized to receive a pin attached to a bollard or a pin attached to a fairlead.

\* \* \* \* \*

UNITED STATES PATENT AND TRADEMARK OFFICE
CERTIFICATE OF CORRECTION

PATENT NO. : 11,235,841 B1
APPLICATION NO. : 17/316297
DATED : February 1, 2022
INVENTOR(S) : Maher et al.

Page 1 of 1

It is certified that error appears in the above-identified patent and that said Letters Patent is hereby corrected as shown below:

In the Claims

In Column 18, Line 15, "means of wrapping" should read --means for wrapping--.

Signed and Sealed this
Tenth Day of May, 2022

Katherine Kelly Vidal
*Director of the United States Patent and Trademark Office*